US008274700B2

(12) United States Patent
Tin

(10) Patent No.: US 8,274,700 B2
(45) Date of Patent: Sep. 25, 2012

(54) CONSTRUCTING SPECTRAL GAMUT BOUNDARY DESCRIPTORS

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 12/435,397

(22) Filed: May 4, 2009

(65) Prior Publication Data

US 2010/0277752 A1 Nov. 4, 2010

(51) Int. Cl.
*G06F 15/00* (2006.01)

(52) U.S. Cl. ......... 358/1.9; 358/518; 382/162; 382/166; 382/167

(58) Field of Classification Search .................. None
See application file for complete search history.

(56) References Cited

U.S. PATENT DOCUMENTS

| | | | |
|---|---|---|---|
| 5,704,026 A | 12/1997 | Wan | |
| 5,721,572 A | 2/1998 | Wan et al. | |
| 5,832,109 A | 11/1998 | Mahy | |
| 5,872,898 A | 2/1999 | Mahy | |
| 6,480,301 B1 | 11/2002 | Cholewo | |
| 6,646,763 B1 | 11/2003 | Estrada | |
| 6,698,860 B2 | 3/2004 | Berns et al. | |
| 7,177,047 B2 | 2/2007 | Rozzi | |
| 7,233,413 B2 | 6/2007 | Jones et al. | |
| 7,411,701 B2 | 8/2008 | Boll | |
| 7,414,631 B2 * | 8/2008 | Tin | 345/590 |
| 7,583,406 B2 * | 9/2009 | Spaulding et al. | 358/1.9 |
| 7,715,070 B2 * | 5/2010 | Newman et al. | 358/518 |
| 7,755,817 B2 * | 7/2010 | Ho et al. | 358/523 |
| 7,822,270 B2 * | 10/2010 | Van Hoof et al. | 382/167 |
| 8,098,400 B2 * | 1/2012 | Tin | 358/1.9 |
| 2003/0098896 A1 | 5/2003 | Berns et al. | |
| 2005/0047648 A1 * | 3/2005 | Newman et al. | 382/162 |
| 2006/0119870 A1 | 6/2006 | Ho et al. | |
| 2007/0081176 A1 | 4/2007 | Newman et al. | |
| 2007/0091335 A1 | 4/2007 | Shaw et al. | |
| 2007/0097389 A1 | 5/2007 | Morovic | |
| 2007/0121132 A1 | 5/2007 | Blinn et al. | |
| 2007/0188786 A1 | 8/2007 | Kim et al. | |
| 2007/0195382 A1 | 8/2007 | Cho et al. | |
| 2008/0117444 A1 | 5/2008 | Stokes | |

(Continued)

OTHER PUBLICATIONS

Derhak, Maxim W. and Rosen, Mitchell R., "Spectral Colorimetry Using Lab/PQR-An Interim Connection Space", Proc. 12th CIC, pp. 246-250 (2004).

(Continued)

*Primary Examiner* — Dung Tran
(74) *Attorney, Agent, or Firm* — Fitzpatrick, Cella, Harper & Scinto

(57) ABSTRACT

Color management in which a spectrally-based ICS color value is spectrally gamut mapped onto a spectral gamut of a destination device using a simplified Gamut Boundary Descriptor (GBD) that represents the spectral gamut of the destination device, and the gamut-mapped ICS value is converted into a destination-side color. The simplified GBD is constructed by generating sample points that span the spectral gamut of the destination device, forming a full spectral GBD by applying a hulling algorithm to the sample points, identifying sample points that are vertices of the full GBD of the spectral gamut, partitioning the vertices of the full GBD into clusters, such that the clusters are at least at a certain threshold distance apart, choosing a representative sample point from each cluster, and forming the simplified GBD by applying the hulling algorithm to the representative sample points from each cluster.

56 Claims, 17 Drawing Sheets

U.S. PATENT DOCUMENTS

| | | | |
|---|---|---|---|
| 2009/0185200 A1* | 7/2009 | Tin | 358/1.9 |
| 2010/0104179 A1* | 4/2010 | Tin | 382/167 |
| 2010/0128976 A1* | 5/2010 | Stauder et al. | 382/162 |
| 2010/0328341 A1* | 12/2010 | Stauder et al. | 345/593 |

OTHER PUBLICATIONS

Tsutsumi, Shohei, Rosen, Mitchell R. and Berns, Roy S., "Spectral Reproduction using LabPQR: Inverting the Fractional-Area Coverage-to-Spectra Relationship", Proc. ICIS'06, pp. 107-11-(2006).

Bastani, Behnam and Funt, Brian, "Spectral Gamut Mapping and Gamut Concavity", Proc. 15th CIC, pp. 218-221 (2007).

Gonzalez, Sergio "Evaluation of Bispectral Spectrophotometry for Accurate Colorimetry of Printing Materials", RIT, Jun. 2000.

Poynton, C.A. "Wide Gamut Device-Independent Colour Image Interchange", Sun Microsystems Computer Corporation U.S.A., pp. 218-222.

Giesen et al., "Toward Image-Dependent Gamut Mapping: Fast and Accurate Gamut Boundary Determination", Color imaging. Conference No10, San Jose CA , ETATS-UNIS (Jan. 17, 2005), vol. 5667, pp. 201-210.

Perry et al., "A New Representation for Device Color Gamuts", Mitsubishi Electric Research Laboratory (2001).

Pellegri et al., "Gamut Boundary Determination for a Colour Printer Using the Face Triangulation Method", Color Imaging: Device-Independent Color, Color Hardcopy, and Applications VII, Proceedings of SPIE vol. 5008 (R. Eschbach, G.G. Marcu eds.), pp. 92-100, 2003.

\* cited by examiner

CONSTRUCTING SPECTRAL GAMUT BOUNDARY DESCRIPTORS

FIELD

The present disclosure relates to constructing spectral gamut boundary descriptors, and more particularly relates to constructing spectral gamut boundary descriptors for use in spectral color management systems.

BACKGROUND

In the field of this disclosure, spectral color management systems have been proposed that include multi-spectral image capture devices and multi-ink printers. In such a spectral color management system, a scene is captured by an image capture device (e.g., a multi-spectral digital camera), and a multi-ink printer generates printed output having spectral reflectance properties that are a good match to the spectral reflectance properties of objects included in the captured scene. By matching the spectral reflectance properties of the printed output with the spectral reflectance properties of the captured scene, the spectral color management system can generate printed output whose colors match the colors of original objects in the captured scene under different lighting conditions.

FIG. 1 shows an example workflow of a spectral color management system. A multi-spectral source device (e.g., a multi-spectral digital camera) generates a multi-spectral digital image of a captured scene. The generated image is represented in a device color space specific to the multi-spectral source device (i.e., source device color space 1). A forward source device conversion module 10 for the multi-spectral source device then converts the generated image into a spectral reflectance space 2 by using a forward source device model 14. The spectral reflectance representation of the image is generated such that it represents the spectral reflectance of objects in the captured scene.

In particular, the spectral reflectance space 2 is typically determined algorithmically based on measurements of spectral reflectance of stimuli in a reference target and the corresponding response from the multi-spectral source device. Such measurements record the fraction of light reflected at a wavelength in the visual wavelength range that runs approximately from 400 nm to 700 nm. If the measurements of spectral reflectance are taken at every 10 nm in the wavelength range that runs from 400 nm to 700 nm, the spectral reflectance space 2 has a dimension of 31.

The spectral reflectance representation of the generated image is then further converted into an Interim Connection Space (ICS) 3 by an ICS conversion unit 11. The dimension of the ICS is taken to be an integer that is small relative to the dimensionality of spectral space 2, typically from 5 to 8.

A gamut mapping module 12 performs gamut checking to determine whether a spectral ICS value of the generated image is reproducible on an intended destination device, such as, for example, a multi-ink printer. A determination that a spectral ICS value of the generated image is reproducible on the destination device corresponds to an indication that the spectral reflectance of the captured image is reproducible on the destination device. The set of spectra reproducible on the destination device is called the spectral gamut of the destination device, and the data structure used to describe the gamut boundary is called the spectral Gamut Boundary Descriptor (GBD). The GBD contains descriptors for the gamut and the gamut boundary. The gamut boundary is typically represented by continuous geometric constructs. A popular GBD construct is the convex hull, which is the smallest convex set in the ICS containing a set of sample points that span a gamut.

If the ICS value can be reproduced on the destination device, then the ICS value is passed to an inverse destination device conversion module 13 that converts the ICS data into the device color space 6 specific to the destination device, by using an inverse destination device model 15. If the ICS value cannot be reproduced on the destination device, then gamut mapping is performed using a GBD 4 of the destination device. Gamut-mapped data in the ICS 5 is passed to the inverse destination device conversion module 13 that converts the ICS data into the device color space 6 specific to the destination device.

In a case where the destination device is a multi-ink printer, the destination device uses the color image data in the device color space 6 to generate printed output having the spectral reflectance properties of the captured scene, such that the colors of the printed output match the colors of original objects in the captured scene under different lighting conditions.

SUMMARY

One problem with known spectral color management systems is that computational complexity increases exponentially as the dimension of the ICS increases. Typically, gamut checking and gamut mapping using a convex hull GBD are performed by iterating through a set (or subset) of facets of the convex hull GBD. As the number of facets in the convex hull GBD increases, so does the computational complexity of performing gamut checking and gamut mapping. FIG. 2 illustrates how the number of facets in a convex hull GBD increases exponentially as the dimension of the ICS increases. Thus, in a high-dimension ICS, the computational complexity of performing gamut checking and gamut mapping using a conventional GBD is high.

The inventor herein has observed that because a typical inverse destination device model can handle at least slightly out-of-gamut ICS color values, it is not ordinarily necessary for the GBD to represent the gamut as accurately as possible.

Based on this observation, the foregoing situation of exponentially increasing complexity is addressed through the provision of a simplified GBD that is formed by partitioning vertices of an initial GBD into clusters, and applying a hulling algorithm to representative sample points in each cluster.

Thus, in an example embodiment described herein, color management is architected so as to convert a source-side color in a source device dependent color space into a counterpart destination-side color in a destination device dependent color space. A multi-spectral color image is generated in the source device dependent color space using a multi-spectral source device, the multi-spectral color image is converted into a spectral reflectance representation in a spectral reflectance space, and the spectral reflectance representation is converted into a spectrally-based Interim Connection Space (ICS) representation in a spectrally-based ICS. Each spectrally-based ICS value of the spectrally-based ICS representation is spectrally gamut mapped onto the spectral gamut of the destination device using a simplified spectral Gamut Boundary Descriptor (GBD) that represents the spectral gamut boundary of the destination device, and each gamut-mapped spectrally-based ICS value is converted into a destination-side color in the destination device dependent color space of the destination device. The simplified spectral GBD is constructed by generating sample points that span the spectral gamut of the destination device, forming a full spectral GBD by applying a hulling algorithm to the sample points, identifying sample points that are vertices of the full GBD of the spectral gamut, partitioning the vertices of the full GBD into clusters, such that the clusters are at least at a certain threshold distance apart, choosing a representative sample point from each cluster, and forming the simplified spectral GBD by applying the hulling algorithm to the representative sample points from each cluster.

Because the simplified spectral GBD is formed using a subset of the vertices of the full (i.e., conventional) GBD, the simplified spectral GBD has fewer vertices than the full GBD. Since the number of facets in a GBD is determined by the number of vertices in the GBD, the simplified spectral GBD also has fewer facets than a conventional GBD. Thus, the computational complexity of performing gamut checking and gamut mapping using the simplified GBD may be lower in comparison to performing these operations using a conventional GBD.

In example embodiments, the vertices of the full GBD are partitioned into clusters by forming an initial set of clusters each containing one vertex, selecting a pair of clusters having a smallest distance among all pairs of clusters, and in response to a determination that the distance of the selected pair is less than the threshold distance, merging the selected pair of clusters to form a new cluster. The selecting step is repeated until the distance of any remaining pairs of clusters are greater than or equal to the threshold distance.

In example embodiments, an error metric for the simplified spectral GBD is calculated, and it is determined whether the error metric satisfies an error tolerance. In response to a determination that the error metric does not satisfy the error tolerance, the threshold distance is decreased, and a new simplified spectral GBD is constructed using the decreased threshold distance.

In example embodiments, discarded vertices of the full GBD that are not included in the simplified spectral GBD are identified, and an error metric is calculated for each discarded vertex. For each discarded vertex, it is determined whether the error metric satisfies an error tolerance. In response to a determination that the error metric for a vertex does not satisfy the error tolerance, the vertex is identified as a reinstated vertex. A new simplified spectral GBD is constructed using the vertices of the original simplified spectral GBD and the reinstated vertices.

The hulling algorithm can be a convex hulling algorithm, and the simplified spectral GBD can be a convex hull. Multi-spectral source devices can include multi-spectral digital cameras, and destination devices can include multi-ink printers, reflective display devices, and electronic paper.

This brief summary has been provided so that the nature of this disclosure may be understood quickly. A more complete understanding can be obtained by reference to the following detailed description and to the attached drawings.

DETAILED DESCRIPTION

Figure 1:
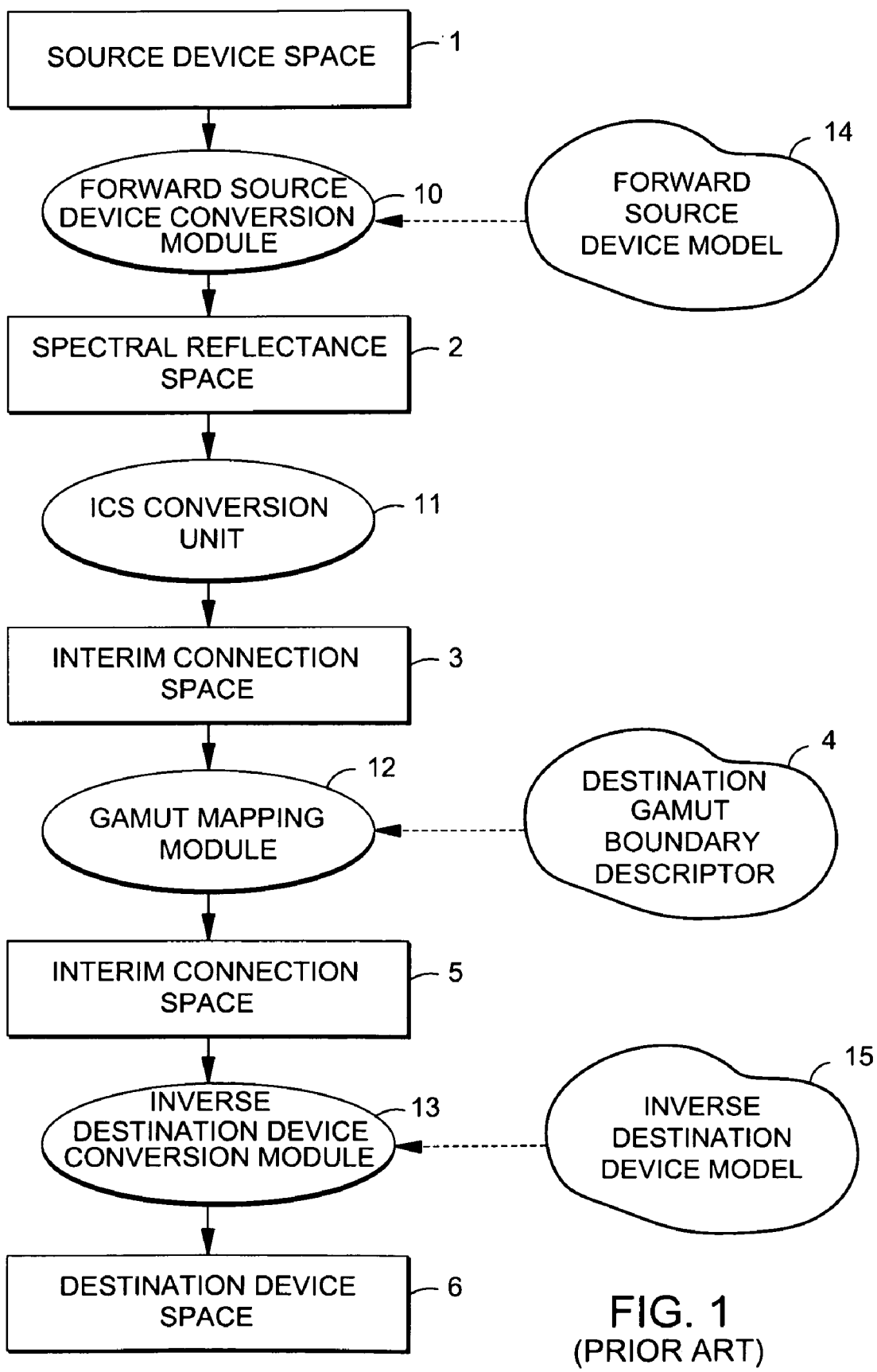
FIG. 1 is a view for explaining the software architecture of a spectral color management system.
Figure 2:
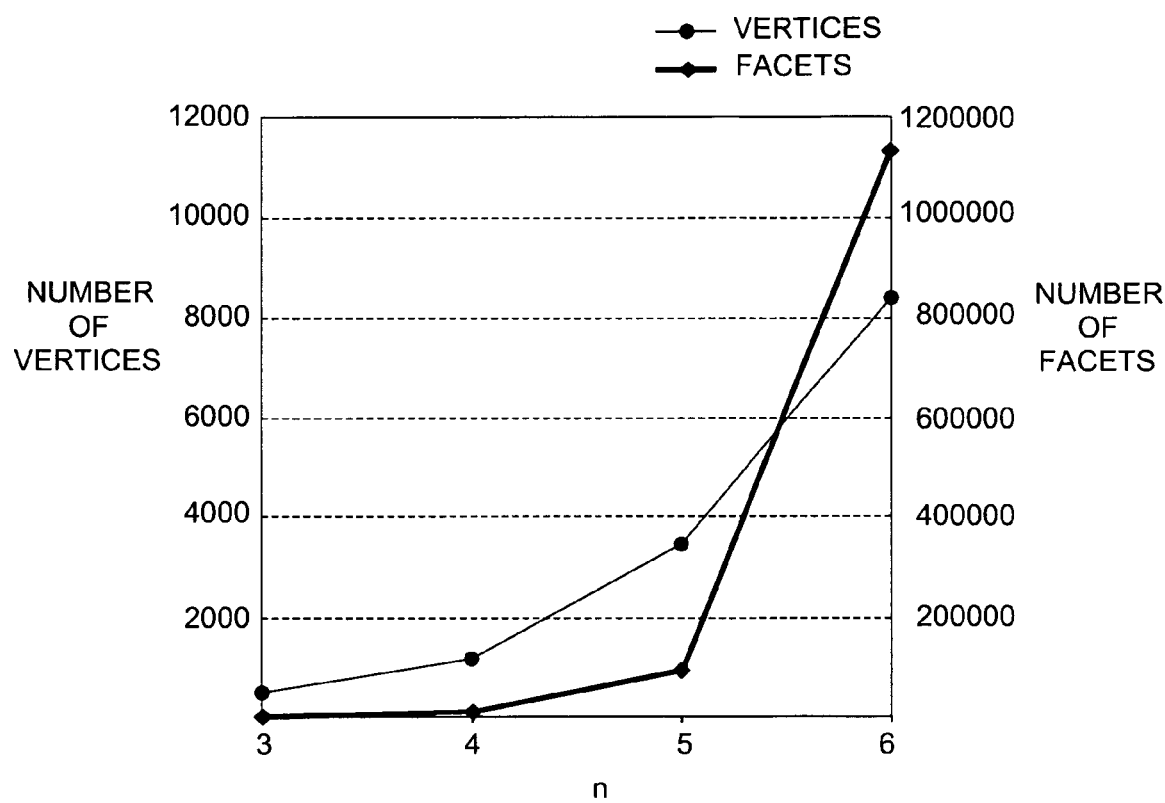
FIG. 2 is a graph that illustrates how the number of vertices and the number of facets in a convex hull GBD increases exponentially as the dimension of the ICS increases.
Figure 3:
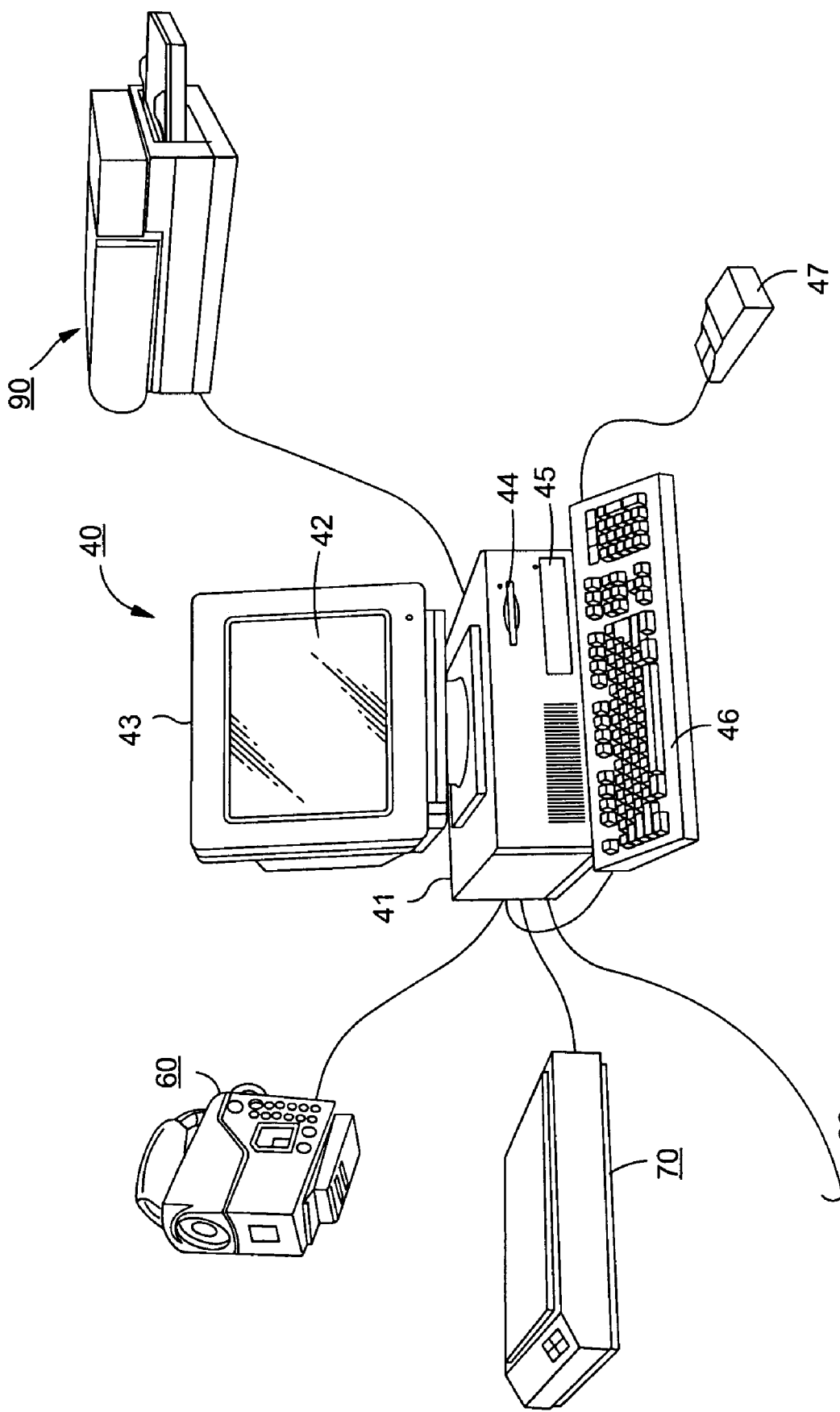
FIG. 3 is a representative view of computing equipment relevant to one example embodiment.

FIG. 3 is a representative view of computing equipment, peripherals and digital devices, relevant to one example embodiment. Computing equipment 40 includes host computer 41 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Host computer 41 also includes computer-readable memory media such as computer hard disk 45 and DVD disk drive 44, which are constructed to store computer-readable information such as computer-executable process steps. DVD disk drive 44 provides a means whereby host computer 41 can access information, such as image data, computer-executable process steps, application programs, etc. stored on removable memory media. In an alternative, information can also be retrieved through other computer-readable media such as a USB storage device connected to a USB port (not shown), or through network interface 80. Other devices for accessing information stored on removable or remote media may also be provided.

Printer 90 is an example of a multi-spectral color output device, and in this example is a multi-ink printer that generates printed output having spectral reflectance properties represented by a spectral image. In particular, printer 90 is a 6-ink CMYKRG color printer which forms color images on a recording medium such as paper or transparencies or the like. Printer 90 forms color images using cyan, magenta, yellow, black, red and green colorants, although printers and other devices can be used which form color images using other colorant combinations that might or might not include black. In addition, printers and other devices having a different number of inks, and capable of generating printed output having spectral reflectance properties represented by a spectral image, can be used.

Multi-spectral digital color scanner 70 is a first example of a multi-spectral color input device, and is provided for scanning documents and images, generating corresponding multi-spectral color image data, and sending the multi-spectral color image data to host computer 41.

Multi-spectral digital color camera 60 is a second example of a multi-spectral color input device, and is provided for capturing objects, generating corresponding multi-spectral color image data, and sending the multi-spectral color image data to host computer 41.

Of course, host computer 41 may acquire digital image data from other sources such as a multi-spectral digital video camera, a local area network or the Internet via network interface 80. Likewise, host computer 41 may interface with other color output devices, such as color output devices accessible over network interface 80, reflective display devices, and electronic paper.

Figure 4:
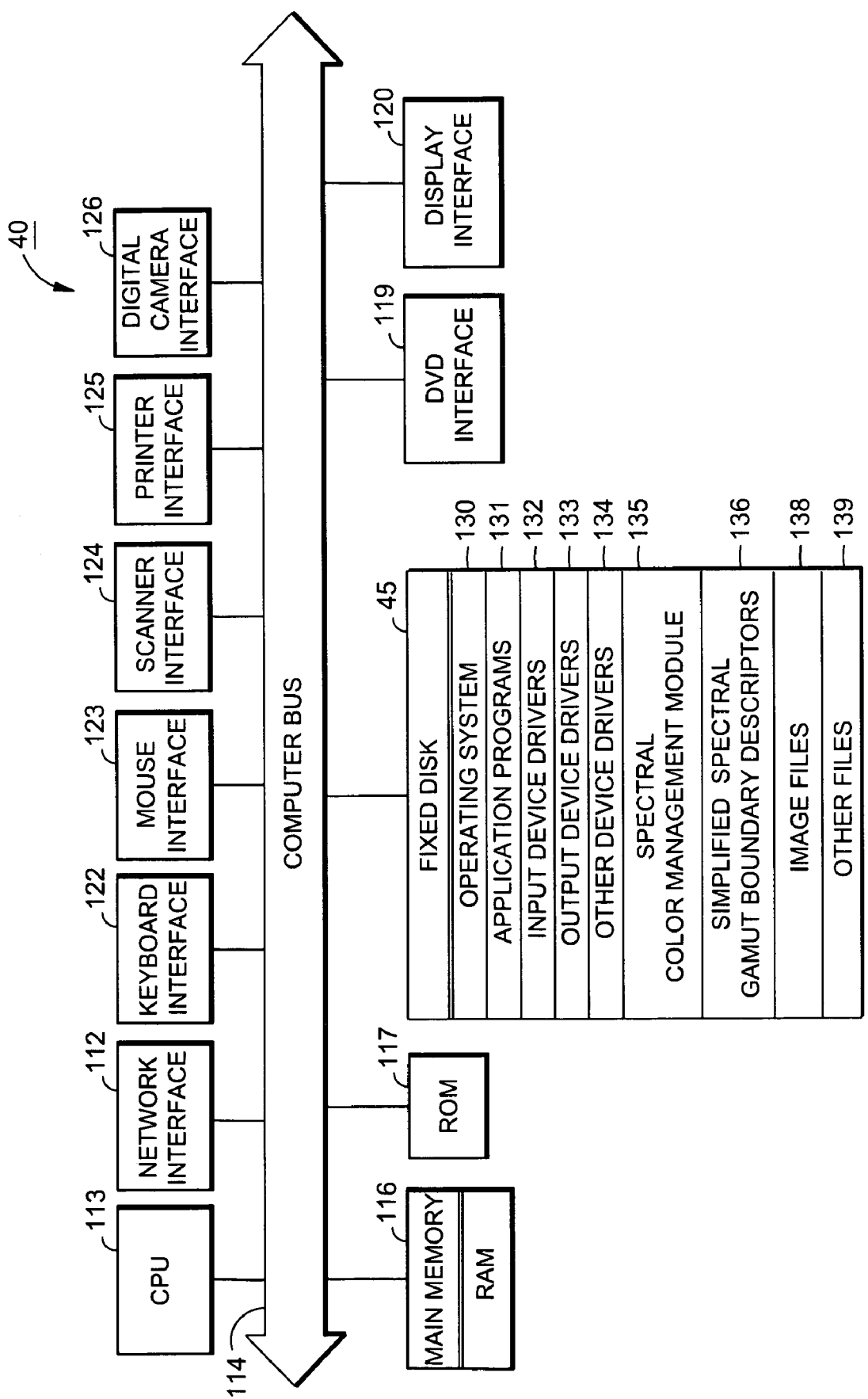
FIG. 4 is a detailed block diagram depicting the internal architecture of the host computer shown in FIG. 3.

FIG. 4 is a detailed block diagram showing the internal architecture of host computer 41 of computing equipment 40. As shown in FIG. 4, host computer 41 includes central processing unit (CPU) 113 which interfaces with computer bus 114. Also interfacing with computer bus 114 are hard disk 45, network interface 112, random access memory (RAM) 116 for use as a main run-time transient memory, read only memory (ROM) 117, DVD disk interface 119, display interface 120 for monitor 43, keyboard interface 122 for keyboard 46, mouse interface 123 for pointing device 47, scanner interface 124 for scanner 70, printer interface 125 for printer 90, and digital camera interface 126 for digital camera 60.

RAM 116 interfaces with computer bus 114 so as to provide information stored in RAM 116 to CPU 113 during execution of the instructions in software programs such as an operating system, application programs, color management modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 4, hard disk 45 contains computer-executable process steps for operating system 130, and application programs 131, such as word processing programs or a graphic image management programs. Hard disk 45 also contains computer-executable process steps for device drivers for software interface to devices, such as input device drivers 132, output device drivers 133, and other device drivers 134. Image files 138, including color image files, and other files 139 are available for output to color output devices and for manipulation by application programs.

Spectral color management module (SCMM) 135 comprises computer-executable process steps executed by a computer for managing colors so as to maintain good color fidelity for color images that are transferred from a multi-spectral source device to a destination device, such as the transfer of color image data from capture by multi-spectral digital camera 60 to multi-ink color printer 90. SCMM 135 generally comprises computer-executable process steps that accept a multi-spectral color image generated using a multi-spectral source device (e.g., multi-spectral digital camera 60). The multi-spectral color image has colors with colorant values in a source device dependent color space, and SCMM 135 comprises computer-executable process steps that generate a destination color image having colors with counterpart colorant values in a destination device dependent color space.

More specifically, using device models and color profiles, and/or other color characterizations of the source and destination devices, SCMM 135 converts the multi-spectral color image into a spectral reflectance representation in a spectral reflectance space, and then further converts the spectral reflectance representation into a spectrally-based Interim Connection Space (ICS) representation in a spectrally-based ICS. SCMM 135 spectrally gamut maps each spectrally-based ICS value of the spectrally-based ICS representation onto the spectral gamut of the destination device using a simplified spectral Gamut Boundary Descriptor (GBD) that represents the spectral gamut boundary of the destination device, and each gamut-mapped spectrally-based ICS value is converted into a destination-side color in the destination device dependent color space of the destination device. SCMM 135 constructs the simplified spectral GBD by generating sample points that span the spectral gamut of the destination device, forming a full spectral GBD by applying a hulling algorithm to the sample points, identifying sample points that are vertices of the full GBD of the spectral gamut, partitioning the vertices of the full GBD into clusters, such that the clusters are at least at a certain threshold distance apart, choosing a representative sample point from each cluster, and forming the simplified spectral GBD by applying the hulling algorithm to the representative sample points from each cluster.

The computer-executable process steps for SCMM 135 may be configured as a part of operating system 130, as part of an output device driver such as a printer driver, or as a stand-alone application program such as a color management system. They may also be configured as a plug-in or dynamic link library (DLL) to the operating system, device driver or application program. For example, SCMM 135 according to example embodiments may be incorporated in an output device driver for execution in a computing device, such as a printer driver, embedded in the firmware of an output device, such as a printer, or provided in a stand-alone color management application for use on a general purpose computer. In one example embodiment described herein, SCMM 135 is incorporated directly into the operating system for general purpose host computer 41. It can be appreciated that the present disclosure is not limited to these embodiments and that the disclosed color management module may be used in other computing environments in which color management is used.

Image files 138 comprise spectral image files. In the example embodiment, the spectral image files contain images captured by a multi-spectral capture device, such as a multi-spectral camera or multi-spectral scanner.

Figure 5:
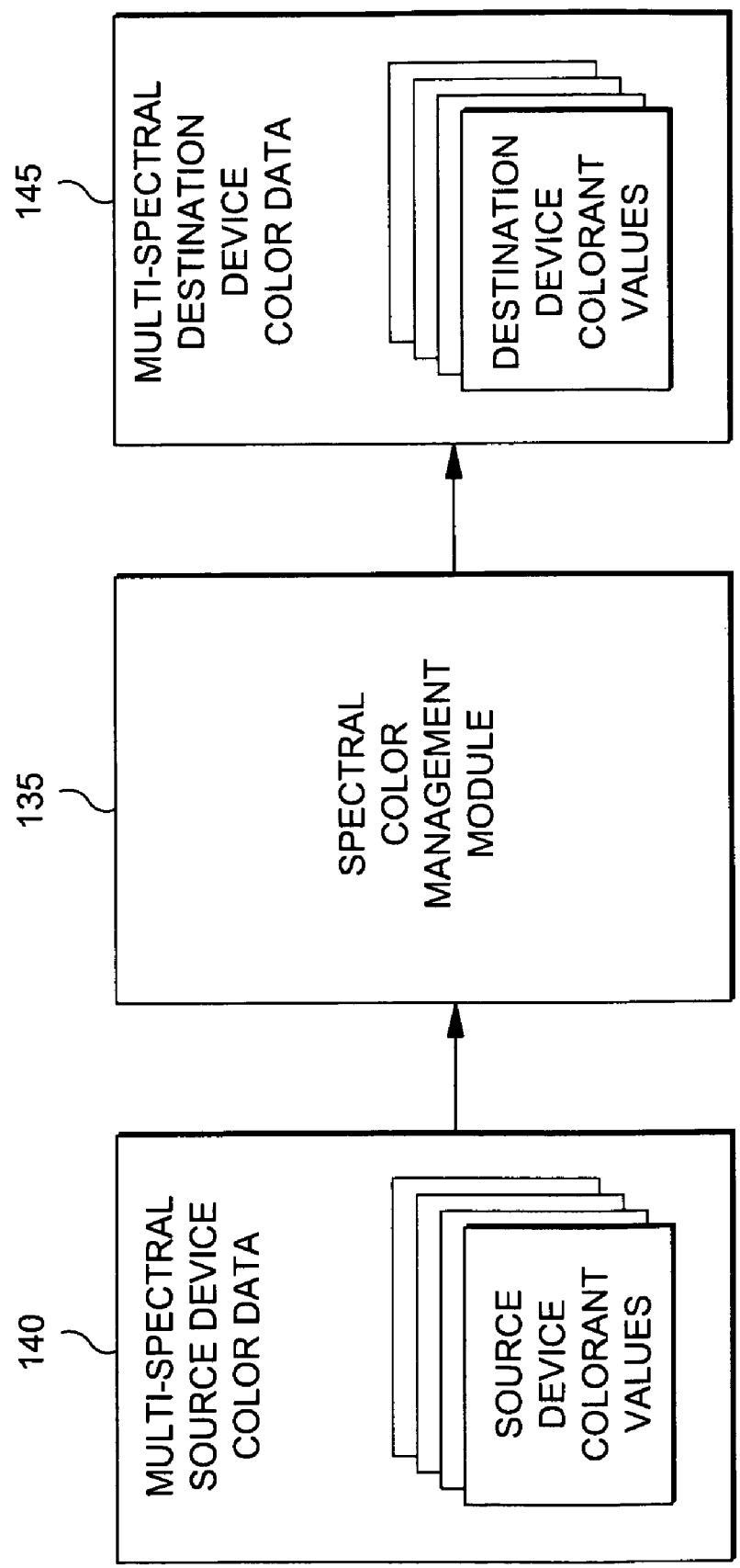
FIG. 5 is a representational view of color transform processing performed by a spectral color management module according to an example embodiment.

FIG. 5 shows a representational view of color transform processing performed by a spectral color management system. As explained hereinabove, a spectral source color image 140 for a multi-spectral source device contains colorant values in a source device color space. In the example embodiment, the source device color space consists of sensor responses of the multi-spectral capture device.

SCMM 135 is applied to the multi-spectral source device colorant values so as to obtain a counterpart color image 145 for a destination device. Because of the effect of processing by SCMM 135, the destination color image 145 exhibits good color fidelity relative to the source color image 140, despite a change from the multi-spectral source device to the destination device, and despite other changes such as changes in viewing conditions and output media. Color image 145 contains colorant values in the destination device color space, such as CMYKRG colorant values in a CMYKRG color space for a multi-ink color printer.

In use of SCMM 135, nearly any spectral device can serve as the source device, and nearly any spectral device can serve as the destination. In one example, the source device might be multi-spectral digital camera 60 which captures an image of an object such as an artwork, and the destination device might be multi-ink color printer 90 which produces a printout of the captured object. In another example, the source device might be multi-spectral scanner 70, which scans a document, and the destination device might be multi-ink color printer 90 or multi-primary display 43. Other combinations and permutations are possible and will be evident to those of ordinary skill in the art.

Figure 6:
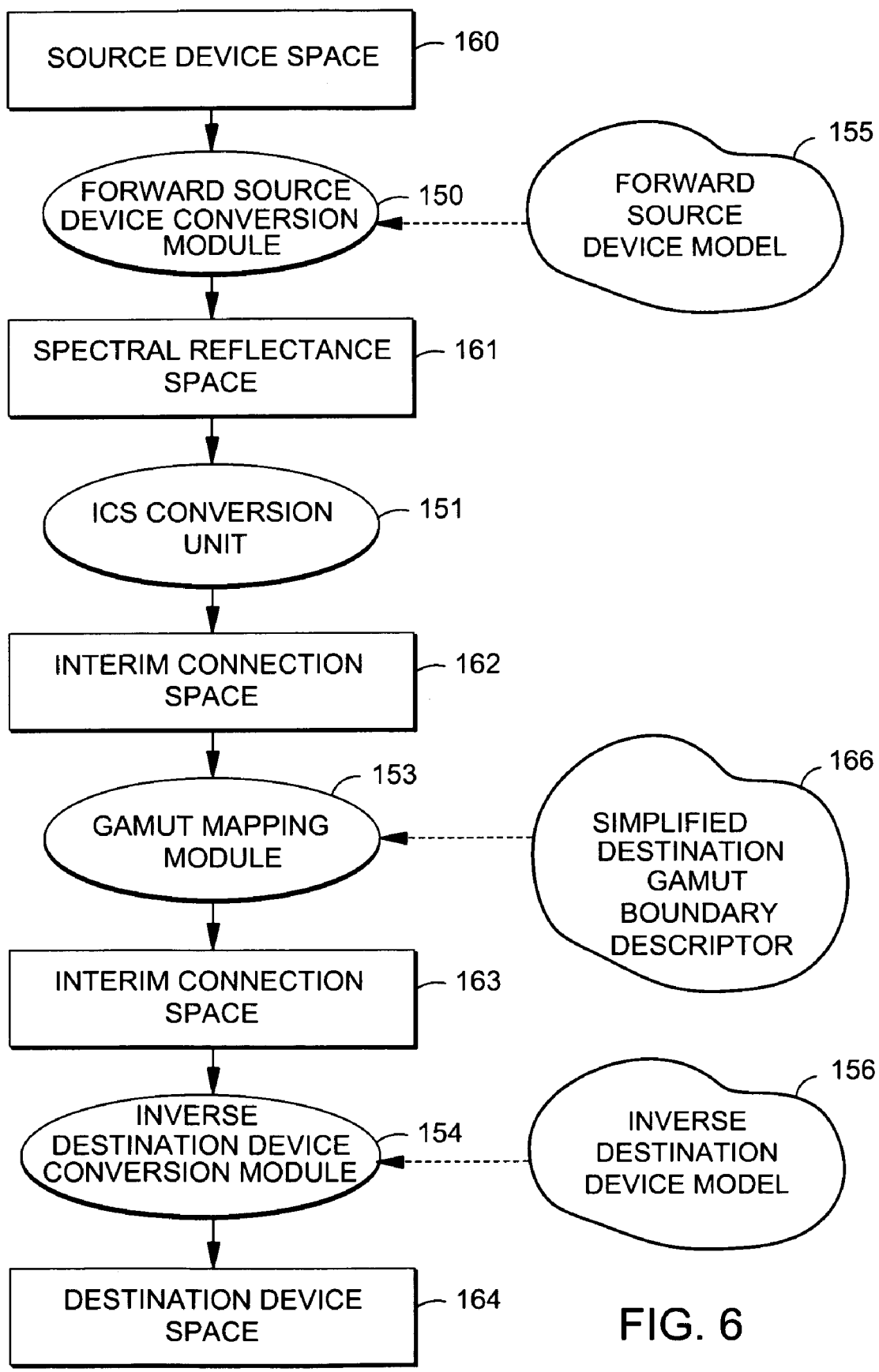
FIG. 6 is a view for explaining the software architecture of a spectral color management module according to an example embodiment.

FIG. 6 is a view for explaining the software architecture of spectral color management module 135 according to an example embodiment. As seen in FIG. 6, spectral color management module 135 is architected in multiple modules, and includes forward source device conversion module 150, ICS conversion module 151, gamut mapping module 153, inverse destination device conversion module 154, and a forward destination device conversion module (not shown).

A multi-spectral digital image of a captured scene, generated by a multi-spectral source device (e.g., multi-spectral digital camera 60), is accessed. The generated image is represented in a device color space specific to the multi-spectral source device (i.e., source device color space 160). The generated image is then received by a forward source device conversion module 150 for the multi-spectral source device.

In the example embodiment, forward source device conversion module 150 uses a forward source device model 155 for a capture device, such as a multi-spectral digital camera, to convert images into spectral reflectance space 161. Forward source device model 155 is built by a statistical method of linear regression on captured data based on a predetermined characterization target, such as the Digital ColorChecker Semi Gloss (SG)®. In the case of a multi-spectral digital camera, a conversion matrix from camera sensor responses to spectral reflectance factors is determined by fitting recorded sensor responses and measured spectral reflectance factors of the color patches on the characterization target. In other embodiments, the forward source device model may be based on any other suitable type of modeling technique.

Forward device module 150 converts the received multi-spectral image, which is in source device color space 160, into a spectral reflectance space 161. The spectral reflectance representation of the image is generated such that it represents the spectral reflectance of objects in the captured scene.

In particular, the spectral reflectance space 161 is typically specified by a sampling of the visual spectrum, which runs approximately from 400 nm to 700 nm. If the measurements of spectral reflectance are taken at every 10 nm in the wavelength range that runs from 400 nm to 700 nm, the spectral reflectance space 161 has a dimension of 31.

The spectral reflectance representation of the generated image is then passed to an ICS conversion unit 151. ICS conversion unit 151 further converts the received spectral reflectance representation of the generated image into an Interim Connection Space (ICS) 162. The dimension of the ICS is taken to be a relatively small integer, relative to the dimensionality of 161, and typically from 5 to 8. The ICS 162 can be constructed, for example, by applying Principal Component Analysis (PCA) to a set of representative spectral reflectance data, by constructing a LabPQR space, see DERHAK, Maxim W. and ROSEN, Mitchell R., "*Spectral Colorimetry Using LabPQR—An Interim Connection Space*", Proceedings of the 12$^{th}$ Color Imaging Conference, pp. 246-250 (2004), the entire contents of which are incorporated by reference as if set forth in full herein, or by performing any other suitable ICS construction process.

The spectrally-based ICS representation of the generated image is passed to gamut mapping module 153. Gamut mapping module 153 performs spectral gamut mapping to map each spectrally-based ICS color value of the spectrally-based ICS representation onto the spectral gamut 163 of the destination device. Gamut mapping module 153 performs gamut mapping using simplified spectral gamut boundary descriptor 166. Simplified destination spectral gamut boundary descriptor (GBD) 166 is a data structure used to describe the boundary of the spectral gamut of the destination device (e.g., multi-ink color printer 90). The spectral gamut of the destination device is the set of spectra reproducible on the destination device. Simplified spectral GBD 166 contains descriptors for the gamut boundary, and is represented by a continuous geometric construct, such as, for example, a convex hull, but in other embodiments, simplified spectral GBD 166 can be represented by other types of continuous geometric constructs. Simplified spectral GBD 166 is formed using a subset of the vertices of the full (i.e., conventional) GBD, as will be described below with respect to FIG. 7. The simplified spectral GBD 166 has less vertices and less facets than a full GBD. Thus, the computational complexity of performing gamut checking and gamut mapping using simplified spectral GBD 166 may be lower in comparison to performing these operations using a conventional GBD.

After gamut mapping module 153 gamut maps a spectrally-based ICS value, the gamut-mapped spectrally-based ICS value is passed to inverse destination device conversion module 154. Inverse destination device conversion module 154 converts the received gamut-mapped spectrally-based ICS value into a destination-side color in destination device dependent color space 164, which is the color space of the destination device (e.g., multi-ink color printer 90). Inverse destination device conversion module 154 performs the conversion by using an inverse destination device model 156.

Figure 7:
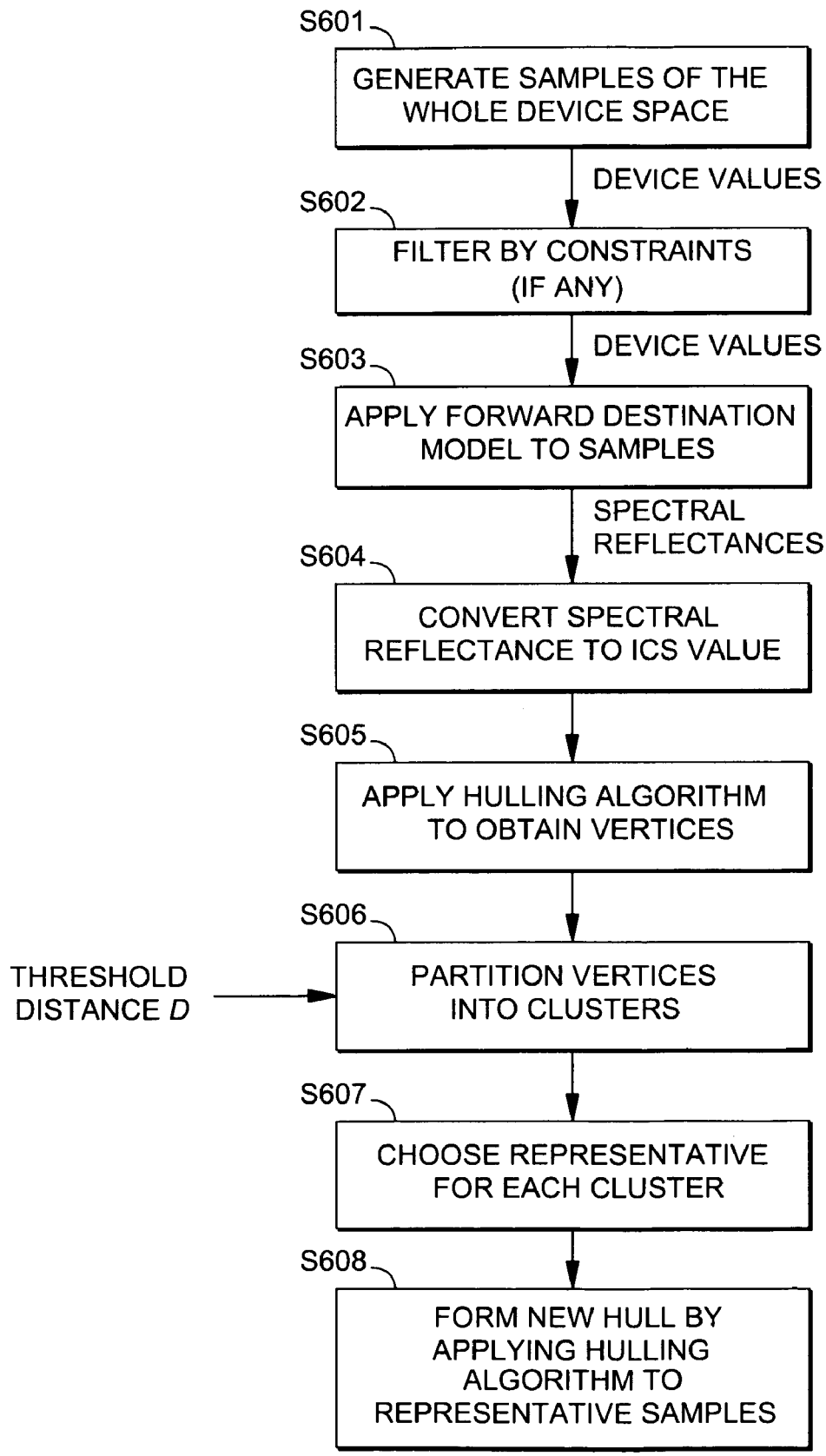
FIG. 7 is a flow diagram for explaining construction of a simplified spectral gamut boundary descriptor in a color management module according to an example embodiment.

FIG. 7 is a flow diagram for explaining construction of simplified spectral GBD 166 according to an example embodiment. The process steps shown in FIG. 7 are computer-executable process steps stored on a computer-readable memory medium such as at 135 on disk 45, and are executed by CPU 113 of host computer 41, so as to construct simplified spectral GBD 166. In the example embodiment, the destination device is a multi-ink printer, e.g., multi-ink color printer 90, but in other embodiments, the destination device can be, for example, a reflective display device or a display device with electronic inks.

In other embodiments, the simplified spectral gamut GBD is pre-computed and stored for an end-user in a different machine, such as a machine of a manufacturer of an output device (e.g., multi-ink color printer 90). In this case, the process steps shown in FIG. 7 are executed by a CPU of the output device manufacturer's computer, and the simplified spectral GBD is stored on a computer-readable medium. An end-user obtains the simplified spectral GBD from the computer-readable medium as file 136, for use by host computer 41.

Briefly, according to the process steps shown in FIG. 7, sample points are generated that span the destination device dependent color space of the destination device. Each of the generated sample points is converted into spectral reflectance values in a spectral reflectance space. The spectral reflectance values are converted into spectrally-based ICS values in a spectrally-based ICS. A full spectral GBD is formed by applying a hulling algorithm to the spectrally-based ICS sample points. Spectrally-based ICS sample points that are vertices of the full GBD are identified, and the vertices of the full GBD are partitioned into clusters, such that the clusters are at least at a certain threshold distance apart. A representative spectrally-based ICS sample point is chosen from each cluster, and the simplified spectral GBD is formed by applying the hulling algorithm to the representative spectrally-based ICS sample points from each cluster.

In more detail, in step S601 spectral color management module (SCMM) 135 generates sample points that span the destination device dependent color space of the destination device. Sampling steps are generated for each ink. The number of sampling steps, s, generated for each ink is sufficiently large in order to span the gamut of the destination device sufficiently. In other embodiments, rather than generate the sampling steps for a multi-ink color printer such that they are uniformly distributed in the ink amount, the number of generated sampling steps can be uniformly distributed in another color space, such as, for example, CIELAB space or density space. In other embodiments, rather than generate the same number of sampling steps for each ink in a multi-ink color printer, the number of sampling steps can be different for each ink.

For example, in the case of a 6-ink color printer wherein the same number s of sampling steps are generated for each ink, if the number of sampling steps s is 20, a total of $s^6=64,000,000$ ink samples are generated.

In the example embodiment, the sample points are generated by performing a uniform sampling of the destination device dependent color space. In other words, if the number of channels is c, and the number of steps is s, then the sampling grid is formed by the Cartesian product of uniform sampling steps in each channel, giving a total of $s^c$ sample points.

In another example embodiment, the sample points are generated by performing a uniform sampling in each channel, but with a different number of steps in each channel. With $s_i$ number of steps in the ith channel, the total number of sampling points is $s_1 s_2 \ldots s_c$. This may be useful, for example, in reducing sampling steps on the black ink channel. In another example embodiment, each channel is linearized, and the sample points are generated by performing a uniform sampling in each linearized channel of the destination device dependent color space. In another example embodiment, each channel is linearized, and the sample points are generated by performing a uniform sampling in each linearized channel, but with a different number of steps in each channel.

In step S602 SCMM 135 filters the generated sample points for overinking based on constraints, if any constraints are specified. For example, a constraint can limit the ink amount for filtered sample points. Typical ink limits are from 200% to 250%. Sample points having ink amounts that exceed the ink limits are not used.

In step S603, SCMM 135 passes the filtered sample points in the device dependent color space to the forward device conversion module of the destination device. The forward device conversion module of the destination device converts the received sample points in the device dependent color space into spectral reflectance values in the spectral reflectance space, by using a forward destination device model. In more detail, because of the large number of filtered sample points that are typically generated, it may be difficult to print and measure all the samples spectrally. Therefore, the spectral reflectance values are determined algorithmically using the forward destination device model, without actually printing the samples. In this sense, the generated samples are "virtual samples", since they are not actually printed out, and spectral reflectance values are not actually measured. The forward destination device model is typically built on a coarse sampling of the destination device color space, such as a 5-step sampling in each ink, and is based at least partly on a physical modeling, such as the Cellular Yule-Nielsen modified Spectral Neugebauer (CYNSN) model, but in other embodiments, the forward destination device model may be based on any other suitable type of modeling. Samples used to build the forward destination device model are obtained by measuring color patches spectrally. As is the case with the CYNSN model, the forward destination device model can include a LUT (Look Up Table) at least in part.

In step S604, SCMM 135 passes the spectral reflectance values in the spectral reflectance space to ICS conversion unit 151. ICS conversion unit 151 converts the received spectral reflectance values into spectrally-based ICS values in the spectrally-based ICS, thus generating ICS sample points. In the example embodiment, the ICS sample points are stored on a computer-readable memory medium such as in RAM 116.

In step S605, a full spectral GBD is formed by applying a hulling algorithm to the spectrally-based ICS sample points, and spectrally-based ICS sample points that are vertices of the full GBD are identified. The hulling algorithm may be the convex hull algorithm. The convex hull algorithm identifies sample points that are vertices of the convex hull, together with connectivity relationship among them that form facets of the convex hull. In other embodiments, other hulling algorithms may be used that produce non-convex shapes.

In step S606, the identified vertices of the full GBD are partitioned into clusters, such that the clusters are at least at a certain threshold distance D apart. This clustering step will be described below in more detail, with respect to FIGS. 8 to 10.

In step S607, a representative spectrally-based ICS sample point is chosen from each cluster. Step S607 will be described below in more detail, with respect to FIG. 11. In step S608, the simplified spectral GBD is formed by applying the hulling algorithm to the representative spectrally-based ICS sample points from each cluster.

Thus, the simplified spectral GBD will typically have less complexity as compared to the full spectral GBD because vertices are removed from the full spectral GBD to construct the simplified spectral GBD.

Figure 8:
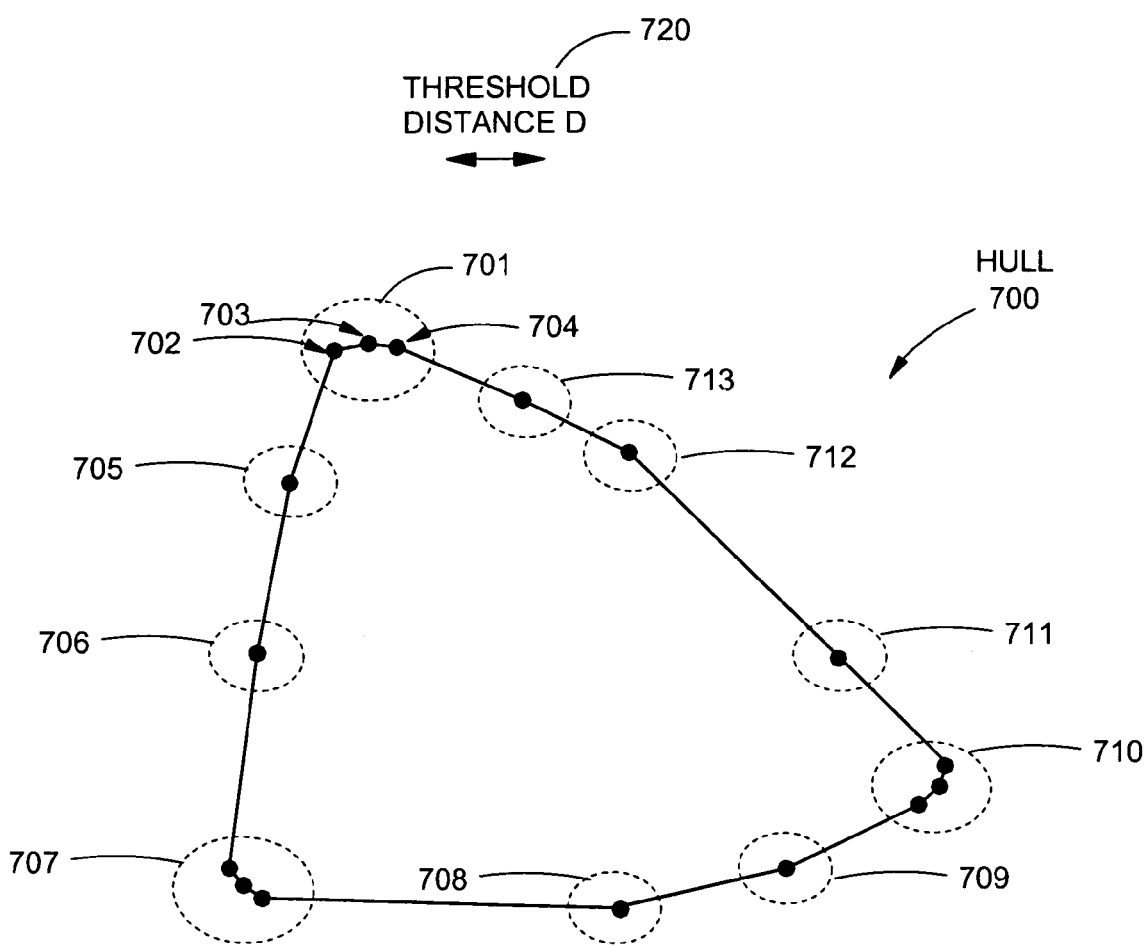
FIG. 8 is an illustration for explaining the clustering of vertices based on a threshold distance, according to an example embodiment.

FIG. 8 illustrates conceptually the step of clustering the vertices based on a threshold distance D. Hull 700 contains vertices, such as vertices 702 to 704, that are partitioned into clusters, such as clusters 701 and 705 to 713. Reference 720 indicates a threshold distance D. As shown in FIG. 8, clusters 701 and 705 to 713 are at least distance D apart from each other. Points within each cluster are all less than the threshold distance D apart from each other. For example, vertices 702 to 704 are not at least at the threshold distance D apart from each other, and are therefore included within cluster 701.

Figure 9:
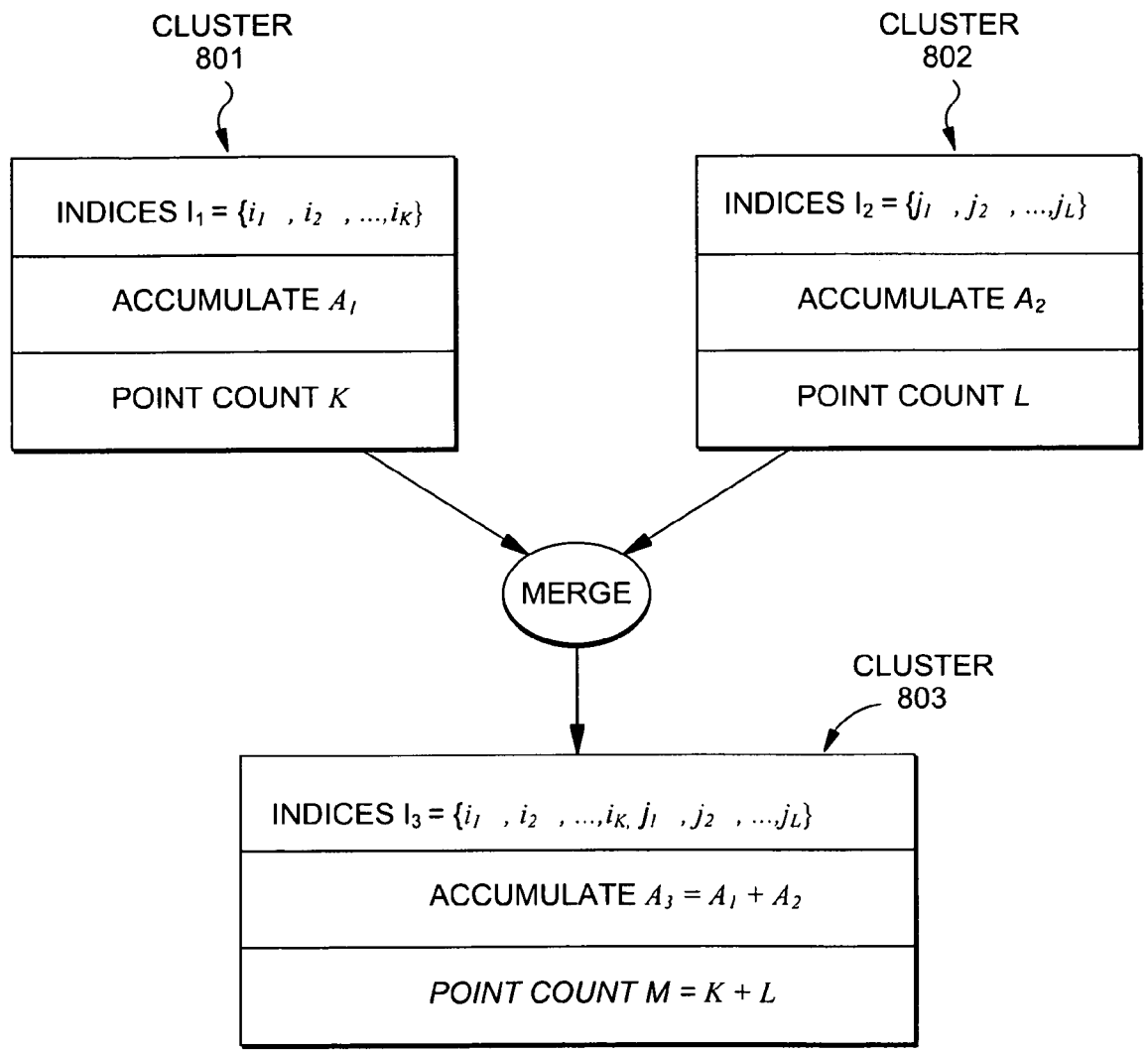
FIG. 9 is an illustration for explaining merging clusters, according to an example embodiment.

FIG. 9 is an illustration for explaining clustering the vertices in more detail. Data structures 801, 802, and 803 represent clusters. Each cluster (e.g., 801, 802, 803) is a subset of the spectrally-based ICS sample points. Each sample point is referenced by an ordinal index. Thus, from a data structure point of view, a cluster consists of a list of indices I={$i_1, \ldots, i_K$} which indexes into the sample points $P_{i_1}, P_{i_2}, \ldots, P_{i_K}$. A cluster also has a "centroid" which is the average of the sample points in the cluster. In order to facilitate merging of two clusters, as will be described below with respect to FIG. 10, instead of the centroid itself, the "accumulate"

$$A = \sum_{j=1}^{K} p_{i_j}$$

and the number of samples K in the cluster are stored in the data structure for the respective cluster. The centroid is then computed on the fly as A/K. The distance between two clusters is defined to be the distance between the centroids of the clusters. Merging two clusters ($I_1$, $A_1$, K) and ($I_2$, $A_2$, L) is performed by forming the triple ($I_3$, $A_3$, M)=($I_1 \cup I_2$, $A_1+A_2$, K+L). The centroid of the merged cluster is computed on the fly as $A_3/M$.

Figure 10:
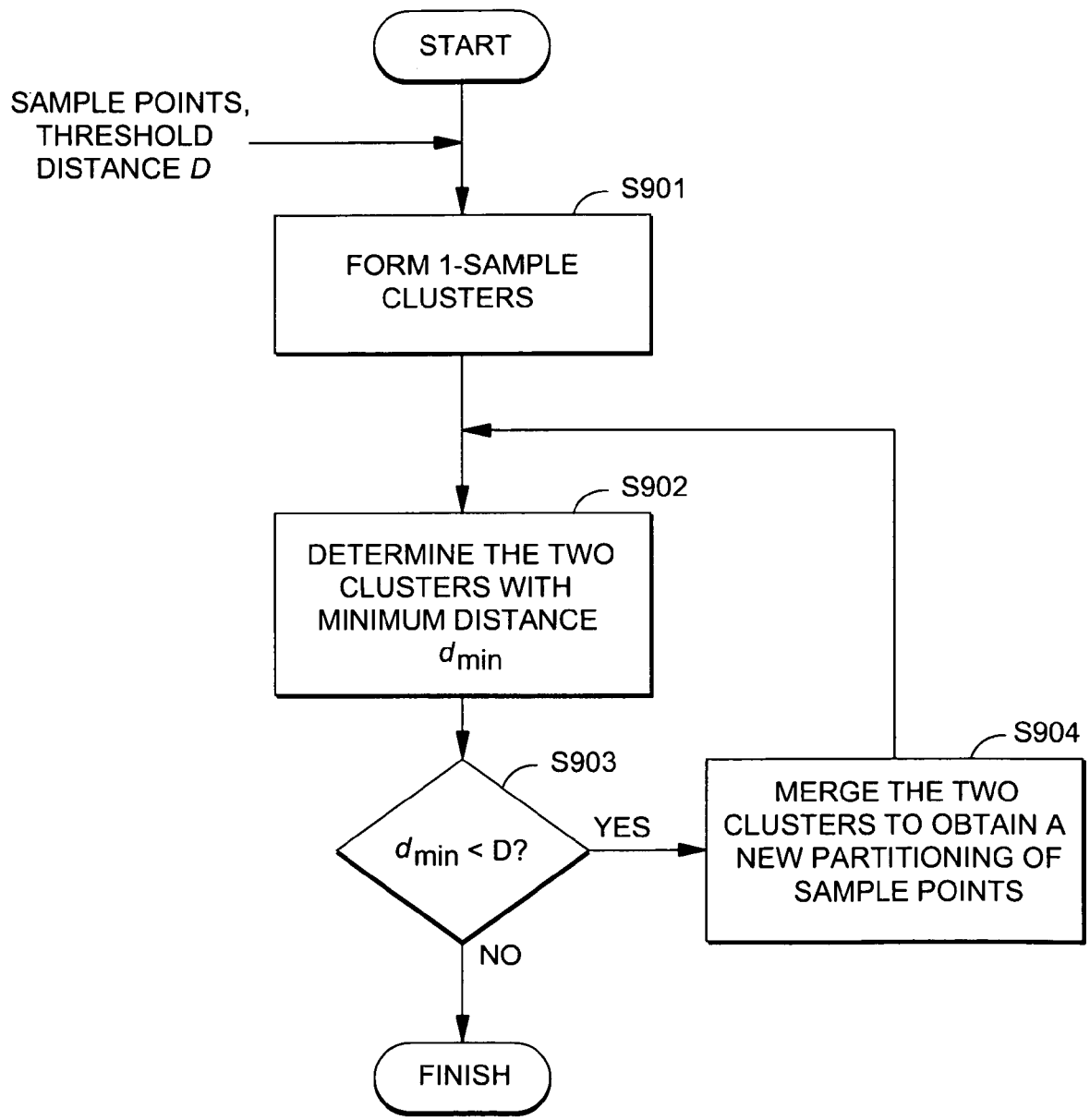
FIG. 10 is a flow diagram for explaining the clustering of vertices based on a threshold distance, according to an example embodiment.

FIG. 10 is a flow diagram for explaining step S606 of FIG. 7 in more detail. As described above, in step S606, vertices of the full GBD are partitioned into clusters, such that the clusters are at least at a certain threshold distance D apart.

In more detail, in step S901, the spectrally-based ICS sample points and a predetermined threshold distance D are obtained, and singleton clusters are formed, wherein each cluster includes exactly one of the spectrally-based ICS sample points. The threshold distance D is related to the Just Noticeable Difference, or JND. This is the difference in color that is just noticeable by a standard observer. In particular, the dimensions of the ICS are scaled so that the JND is 1 unit distance in the ICS, and the threshold distance D is specified as a predetermined multiple of the JND. For example, the threshold distance D can be 5 units. Other multiples of the JND may be used.

In step S902, a pair of distinct clusters is identified, wherein the distance between the two clusters in the pair (i.e., $d_{min}$) is smaller than the distance between any other two clusters. As described above with respect to FIG. 9, the distance between two clusters is the distance between the centroids of the clusters, wherein the centroid of a cluster is the average of the sample points in the cluster.

In step S903, it is determined whether $d_{min}$ is less than the threshold distance D. If it is determined that $d_{min}$ is not less than the threshold distance D ("NO" at step S903) then each pair of distinct clusters is at a distance no less than D, and the process of partitioning vertices into clusters is complete.

Otherwise, if it is determined that $d_{min}$ is less than the threshold distance D ("YES" at step S903), then processing proceeds to step S904. In step S904, the two clusters are merged to form a new cluster (as described above with respect to FIG. 9), thus forming a new partition. After merging the two clusters, processing returns to step S902, where another iteration starts by determining the pair of clusters that have the smallest distance between each other. The clustering process stops when either a configuration is attained in which each cluster is at least a distance D apart from other clusters, or one cluster remains.

Figure 11:
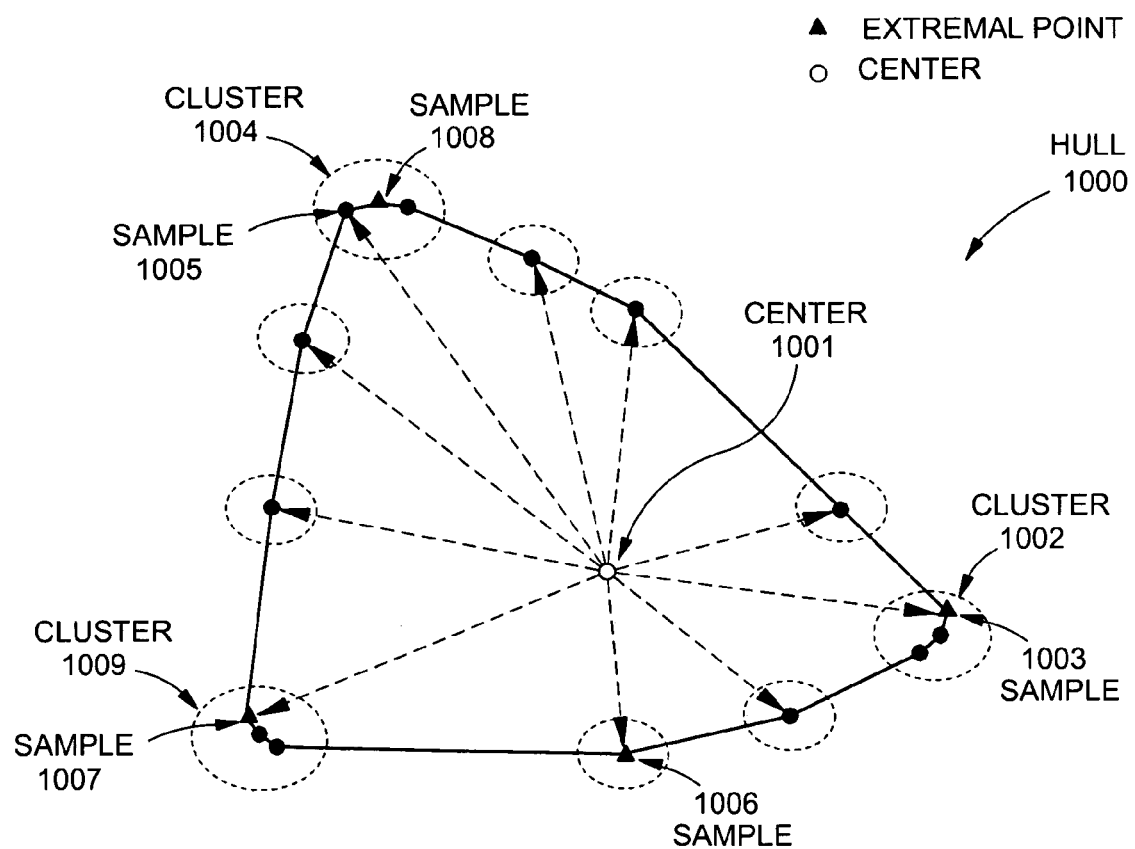
FIG. 11 is an illustration for explaining choosing a representative sample for each cluster, according to an example embodiment.

FIG. 11 is an illustration for explaining choosing a representative sample for each cluster (i.e., step S607 of FIG. 7) in more detail. In particular, in step S607, for each cluster, the spectrally-based ICS sample point in the cluster that is farthest away from the "center" of the hull is chosen to be the representative sample point for a cluster. The "center" of the hull is determined by calculating the average of the extremal points of the hull. The extremal points of the hull are vertices of the hull with at least one of the coordinates equal to either the maximum or the minimum value in that dimension. There can be at most $2^n$ extremal points, where n is the dimension of the ICS.

As shown in FIG. 11, sample points 1003, 1006, 1007, and 1008 are extremal points, and reference 1001 indicates the "center" of hull 1000. The dotted arrows point to the samples chosen from the clusters. As shown in FIG. 11, in clusters 1002 and 1009, the extremal points 1003 and 1007 are the sample points in their respective clusters that are farthest away from center 1001, and are thus chosen as representative sample points. It is noted that even if an extremal point is included in a cluster, it does not necessarily follow that the extremal point will be chosen as the representative sample point of the cluster. In cluster 1004, sample point 1005, which is not an extremal point, is the sample point in the cluster that is farthest away from center 1001, and is thus chosen as the representative sample point. The remaining clusters are singleton clusters that each have a single sample point, and thus, the single sample point is chosen as the representative sample point for the singleton clusters.

In another embodiment, a sample point in a cluster that represents a most pure color is chosen as the representative sample point of the cluster. The sample point that represents the most pure color is the sample with the most number of zero (or near zero) channels in the device value.

In another embodiment, the process of choosing a representative sample point for each cluster involves projecting the full GBD onto a lower dimensional subspace. In particular, the full GBD is projected onto a lower dimensional subspace, and a sample point in the cluster that is also a vertex in the projection of the full GBD is chosen as the representative sample point of the cluster. This process is based on the idea that vertices that continue to show up as vertices in a lower dimensional hull are more important than vertices that do not show up as vertices in the lower dimensional hull. The lower dimensional hull resides in a lower dimensional subspace. The lower dimensional subspace can be for example, the CIEXYZ color space, the CIELAB, color space, or any other suitable type of color space.

Figure 12:
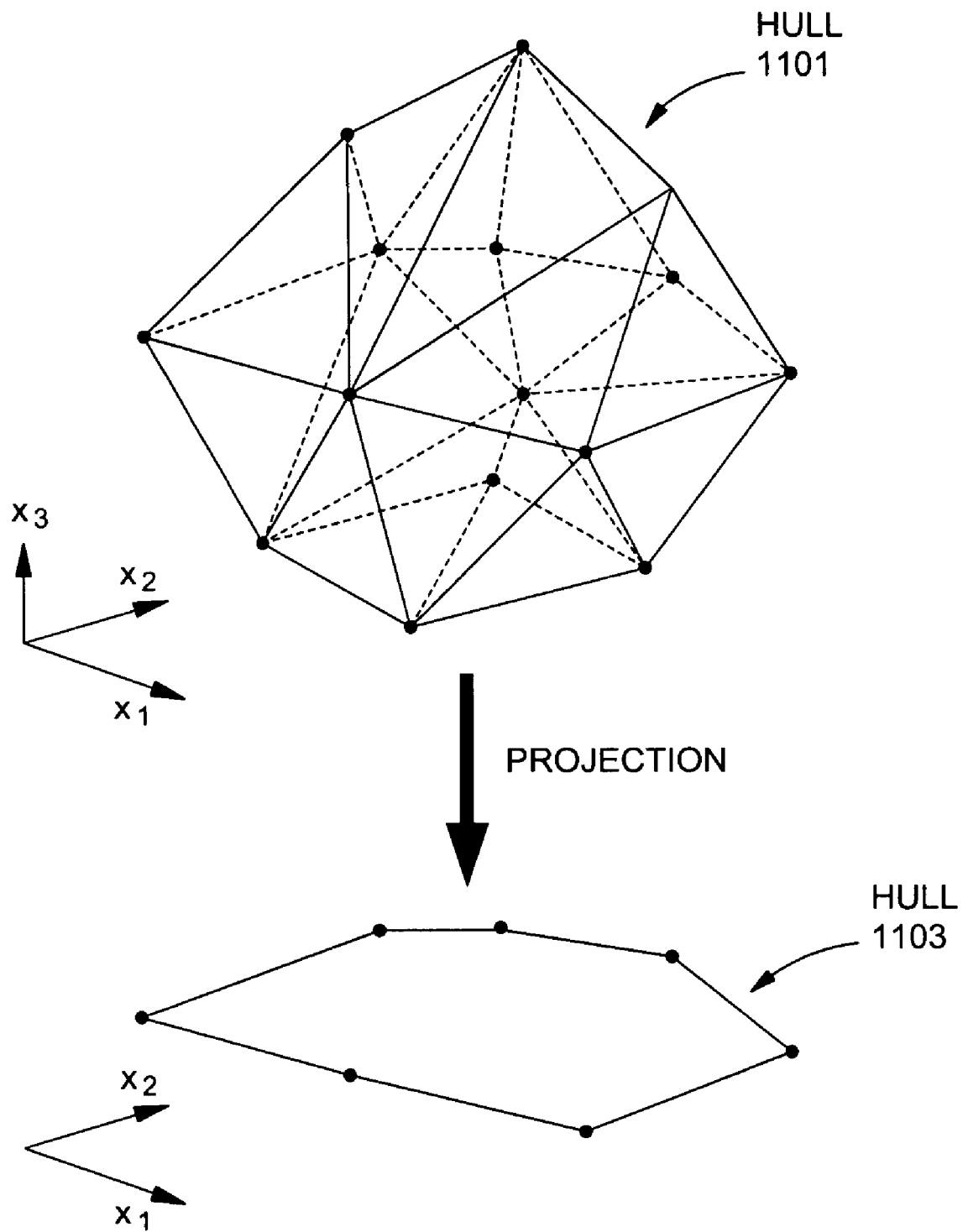
FIG. 12 is an illustration for explaining choosing a representative sample for each cluster, according to an example embodiment.

This process for choosing representative sample points is illustrated conceptually in FIG. 12. FIG. 12 shows the projection of a 3-D space onto a 2-D space, but this low dimensionality is merely for the sake of explanation of concepts. In actual embodiments, the projection is from ICS space (typically 5 to 8 dimensions) onto CIELAB space (3 dimensions).

As shown in FIG. 12, the full GBD represented by hull 1101 in 3-D space $x_1 x_2 x_3$ is projected onto 2-D space $x_1 x_2$. The projection of the full GBD is represented by hull 1103. Under the projection, not all vertices in hull 1101 continue to be vertices in the hull 1103, since some vertices in hull 1101 will become interior points within hull 1103. The vertices in hull 1101 that remain vertices in hull 1103 are points which are chosen to be representative sample points, over other samples that are in the same cluster.

In further embodiments, a combination of the above-described strategies (i.e., the "closest to center", "most pure", and "projection" strategies) for choosing representative sample points in a cluster can be used to choose representative sample points.

Figure 13:
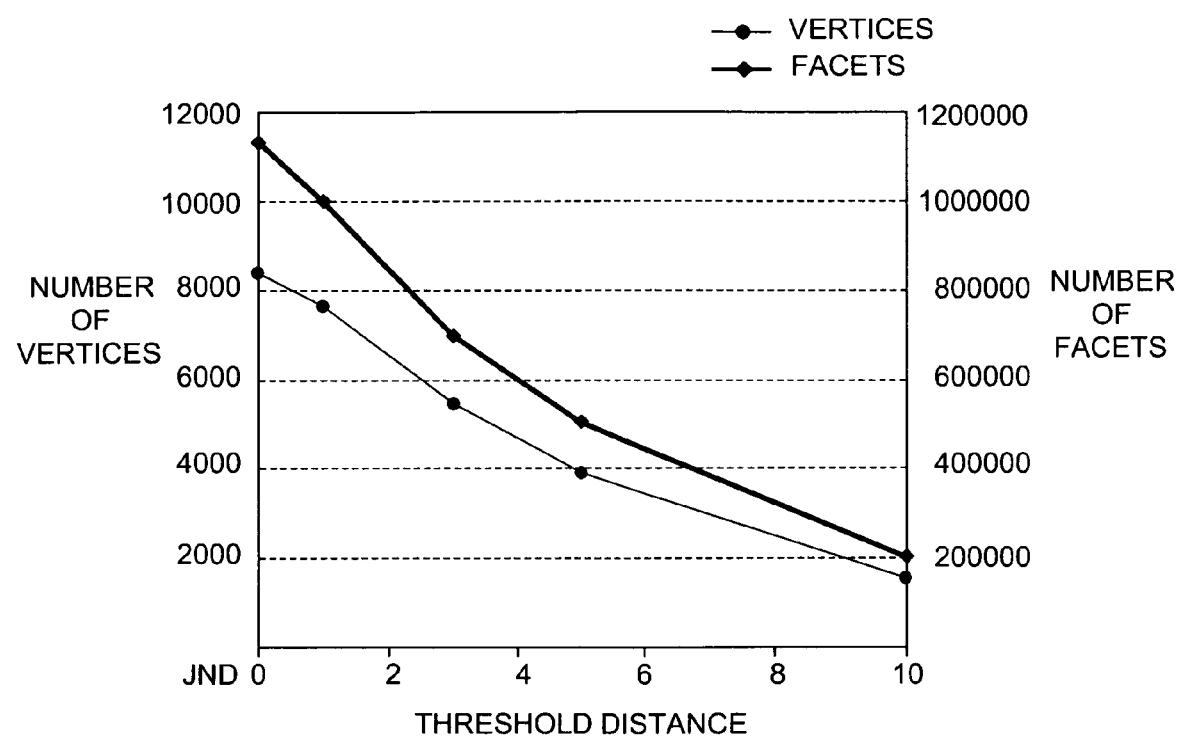
FIG. 13 is a graph for explaining the effect of different threshold distances on hull complexity.

As described above with respect to step S606 of FIG. 7, the identified vertices of the full GBD are partitioned into clusters, such that the clusters are at least at a certain threshold distance D apart. FIG. 13 shows the typical effect on hull complexity when different threshold distances are applied. As shown in FIG. 13, at a threshold distance of about 5 JND (Just Noticeable Difference), the number of vertices and facets are reduced by more than 50%.

The above-described process for constructing the simplified spectral GBD involves discarding vertices from the full spectral GBD. Therefore, use of the simplified GBD, might result in decreased accuracy, as compared to the use of the full spectral GBD. The loss of accuracy, or error, is determined in part by the threshold distance D used to partition the vertices into clusters.

There are several metrics that can be used to evaluate the simplified spectral GBD for a given threshold distance D:
1. Volume ratio: This is the volume of the simplified spectral GBD (i.e., simplified hull) to the volume of the full spectral GBD (i.e. full hull). The smaller the ratio, the higher the error incurred. This metric is a single number.
2. Out of gamut distance of a point from the simplified hull, $d_1$: A discarded vertex may be inside or outside the simplified hull. If it is outside the simplified hull, its distance from the simplified hull is a measure of the error. The maximum of all the $d_1$'s for all the discarded vertices is a single measure of error.
3. Out of gamut distance of a point from the simplified hull, towards the center of the simplified hull, $d_2$: This is similar to $d_1$, but the distance is measured along the line joining the point to the center of the simplified hull. The maximum of all the $d_2$'s for all the discarded vertices is a single measure of error.

Figure 14:
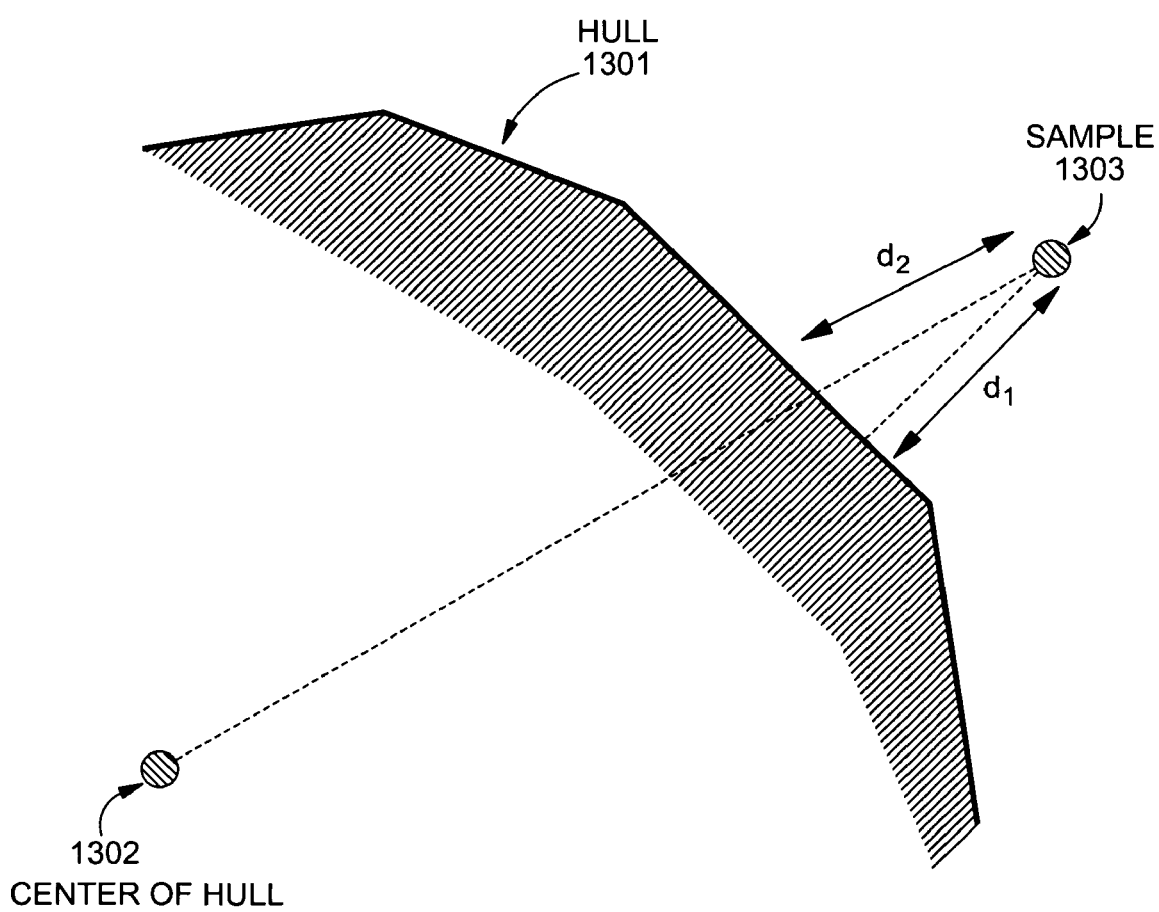
FIG. 14 is an illustration for explaining error metrics used to evaluate the simplified spectral GBD for a given threshold distance, according to example embodiments.

The distance $d_2$ and the distance $d_1$ are illustrated in FIG. 14, wherein 1301 represents the simplified hull, 1303 represents an out of gamut sample point, and 1302 represents the center of hull 1301.

Figure 15:
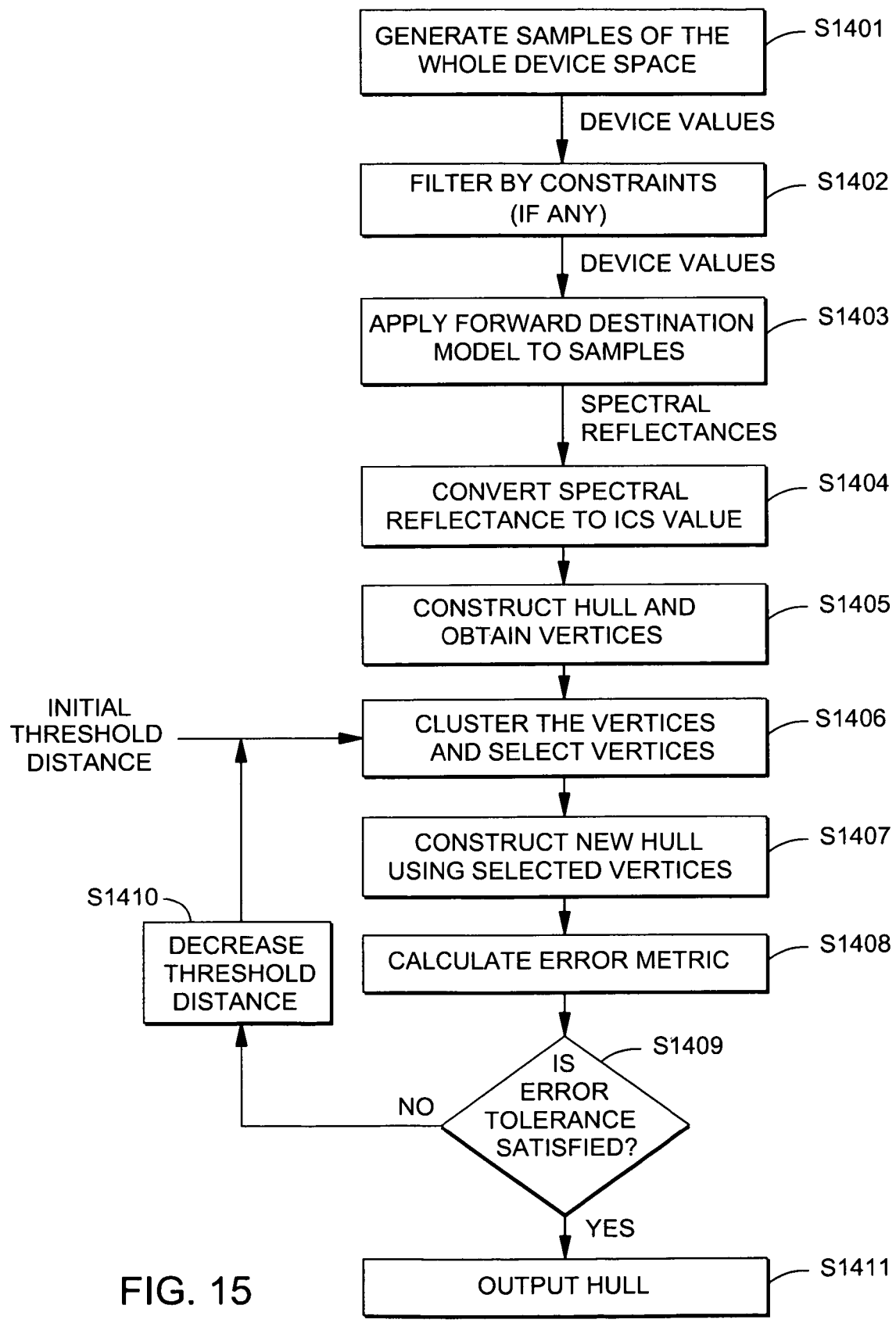
FIG. 15 is a flow diagram for explaining a procedure for constructing the simplified spectral GBD so that a specified error bound is satisfied, according to an example embodiment.

Using one of these error metrics, it is possible to adaptively choose the threshold distance D to satisfy an error tolerance. FIG. 15 illustrates an embodiment of a procedure for constructing the simplified spectral GBD that adaptively adjusts the threshold distance so that the simplified spectral GBD satisfies a specified error bound.

Steps S1401 to S1405 are performed in a manner similar to that described above for steps S601 to S605 (respectively) of FIG. 7. In step S1406, vertices are clustered and representative points are chosen for each cluster, in a manner similar to that described above with respect to steps S606 and S607. The threshold distance D used in step S1406 is an initial threshold distance that will be refined with each error tolerance determination iteration. In step S1407, the simplified spectral GBD is constructed in a manner similar to that described above with respect to step S608.

In step S1408, one of the above-described error metrics is calculated for the simplified spectral GBD, and in step S1409, the calculated error metric is compared to a predetermined error tolerance to determine whether the predetermined error tolerance is satisfied. If the predetermined error tolerance is not satisfied ("NO" at step S1409), then processing proceeds to step S1410. In step S1410, the threshold distance is decreased, and processing returns to step S1406, where the vertices are clustered using the newly decreased threshold distance, thus beginning another error tolerance determination iteration. If the predetermined error tolerance is satisfied ("YES" at step S1409), then the simplified spectral GBD constructed in step S1407 is output as the final simplified spectral GBD in step S1411.

Figure 16:
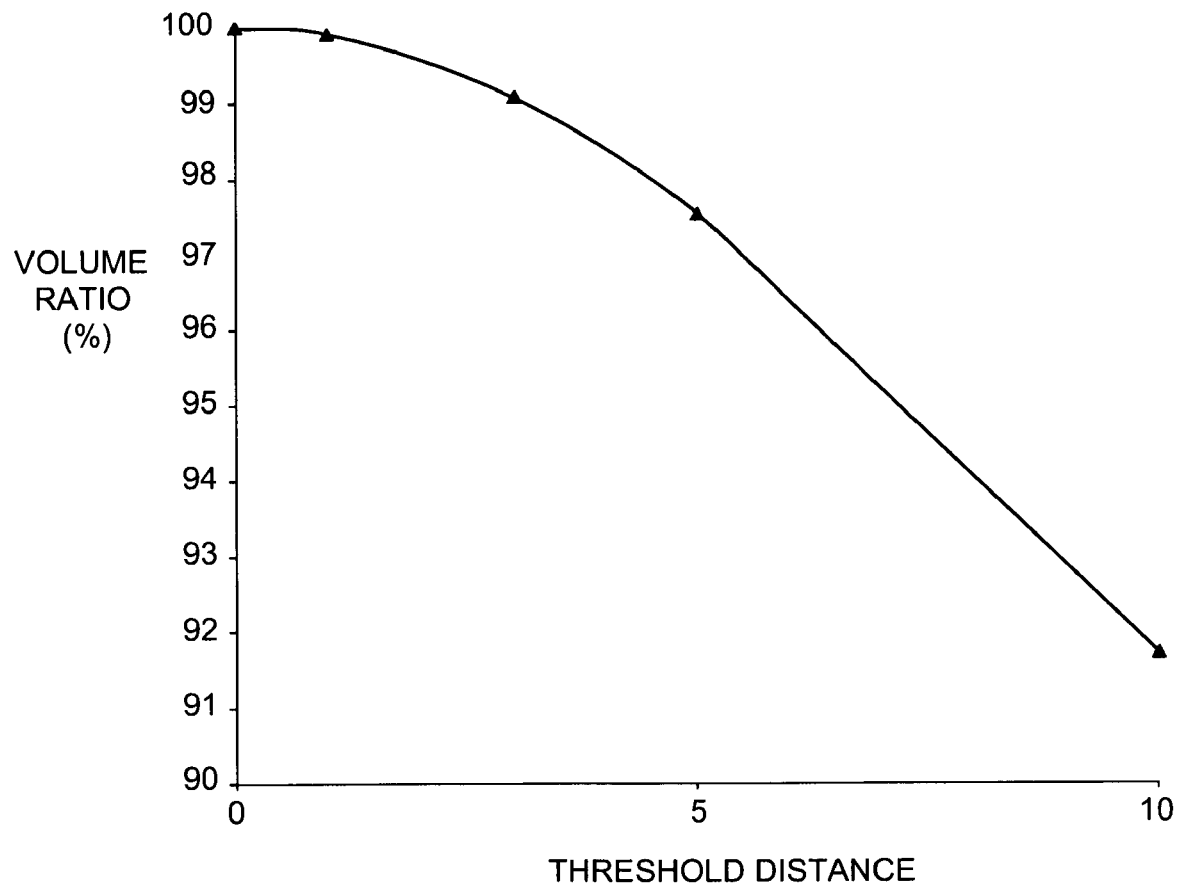
FIG. 16 is a graph that illustrates the relationship between an error metric and the threshold distance, according to an example embodiment.

A refinement can be made as follows: a few error tolerance determination iterations can be performed first using several threshold distances to establish a crude relationship between the error metric and the threshold distance. An example using the volume ratio is shown in FIG. 16. Based on this curve, an initial threshold distance can be determined by looking up against the target error tolerance. By choosing the initial threshold distance in this manner, the number of error tolerance determination iterations preformed may be reduced, thereby improving efficiency.

Figure 17:
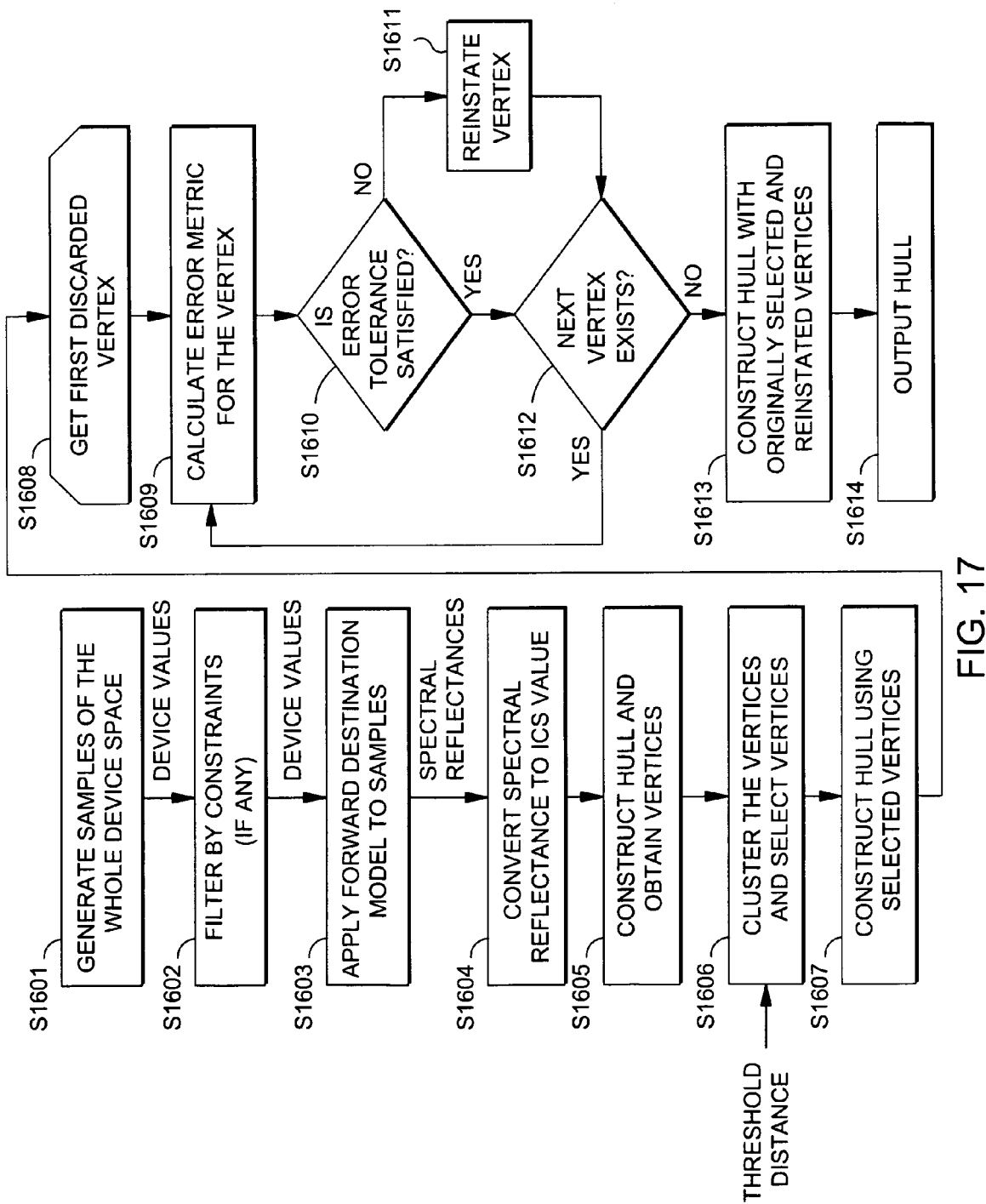
FIG. 17 is a flow diagram for explaining a procedure for constructing the simplified spectral GBD so that a specified error bound is satisfied, according to an example embodiment.

Yet another embodiment of the clustering step involves identifying each discarded vertex of the full GBD, i.e., vertices that are not included in the simplified spectral GBD. An error metric is calculated for each discarded vertex. The error metric can be, for example, either metric $d_1$ or $d_2$ as described above, or any other error metric that can be calculated for an individual vertex. After the simplified spectral GBD (i.e., new hull) is constructed, each discarded vertex is tested by calculating the error metric and comparing the error metric against the error tolerance. If the error is higher than the error tolerance, then the vertex is added back to the hull. This process is illustrated in FIG. 17. The process eliminates vertices that are "redundant", i.e., not significantly extending the gamut and/or concentrated in a cluster, while retaining the vertices that define the gamut.

Steps S1601 to S1607 are performed in a manner similar to that described above for steps S1401 to S1407 (respectively) of FIG. 15. In step S1608, the first vertex discarded during the clustering process performed in step S1606 is obtained. In step S1609, one of the above-described error metrics is calculated for the discarded vertex, and in step S1610, the calculated error metric is compared to a predetermined error tolerance to determine whether the predetermined error tolerance is satisfied.

If the predetermined error tolerance is not satisfied ("NO" at step S1610), then the discarded vertex is identified as a reinstated vertex, and processing proceeds to step S1612. If the predetermined error tolerance is satisfied ("YES" at step S1610), then processing proceeds to step S1612.

In step S1612, it is determined whether a next discarded vertex exists. If a next discarded vertex exists ("YES" at step S1612), then processing returns to step S1609. If a next discarded vertex does not exist ("NO" at step S1612), then processing proceeds to step S1613, where the hulling algorithm is applied to the representative samples (i.e., selected vertices) selected in step S1606 and any reinstated vertices identified in step S1611. The new hull constructed in step S1613 is output in step S1614 as the simplified spectral GBD.

This disclosure has provided a detailed description with respect to particular representative embodiments. It is understood that the scope of the appended claims is not limited to the above-described embodiments and that various changes and modifications may be made without departing from the scope of the claims.

What is claimed is:
1. A color management method which converts a source-side color in a source device dependent color space into a counterpart destination-side color in a destination device dependent color space, said method comprising:
accessing a multi-spectral color image in the source device dependent color space generated using a multi-spectral source device;

converting the multi-spectral color image into a spectral reflectance representation in a spectral reflectance space;

converting the spectral reflectance representation into a spectrally-based Interim Connection Space (ICS) representation in a spectrally-based ICS;

spectrally gamut mapping each spectrally-based ICS value of the spectrally-based ICS representation onto a spectral gamut of a destination device using a simplified spectral Gamut Boundary Descriptor (GBD) that represents the spectral gamut boundary of the destination device; and converting each gamut-mapped spectrally-based ICS value into a destination-side color in the destination device dependent color space of the destination device, wherein the simplified spectral GBD is constructed by generating sample points that span the spectral gamut of the destination device, forming a full spectral GBD by applying a hulling algorithm to the sample points, identifying sample points that are vertices of the full GBD, partitioning the vertices of the full GBD into clusters, such that the clusters are at least at a certain threshold distance apart, choosing a representative sample point from each cluster, and forming the simplified spectral GBD by applying the hulling algorithm to the representative sample points from each cluster, wherein the method is executed by at least one processor.

2. The color management method according to claim 1, wherein the vertices of the full GBD are partitioned into clusters by performing the steps of:

forming an initial set of clusters each containing one vertex; and selecting a pair of clusters having a smallest distance among all pairs of clusters, and in response to a determination that the distance of the selected pair is less than the threshold distance, merging the selected pair of clusters to form a new cluster, wherein the selecting step is repeated until the distances of any remaining pairs of clusters are greater than or equal to the threshold distance.

3. The color management method according to claim 1, wherein for each cluster, a sample point in the cluster farthest away from the center of the full GBD is chosen as the representative sample point of the cluster.

4. The color management method according to claim 1, wherein for each cluster, a sample point in the cluster that represents a most pure color is chosen as the representative sample point of the cluster.

5. The color management method according to claim 1, wherein for each cluster, the full GBD is projected onto a lower dimensional subspace, and a sample point in the cluster that is a vertex in the projection of the full GBD is chosen as the representative sample point of the cluster.

6. The color management method according to claim 1, further comprising:

calculating an error metric for the simplified spectral GBD;

determining whether the error metric satisfies an error tolerance; and in response to a determination that the error metric does not satisfy the error tolerance, decreasing the threshold distance, and constructing a new simplified spectral GBD using the decreased threshold distance.

7. The color management method according to claim 6, wherein the error metric is a ratio of a volume of a full spectral GBD to a volume of a simplified spectral GBD.

8. The color management method according to claim 6, wherein the error metric is a maximum of distances, wherein each distance is a distance of a point in the full spectral GBD to the simplified spectral GBD and the point is outside the simplified spectral GBD.

9. The color management method according to claim 8, wherein the distance is a distance measured along a line joining the point to a center of the GBD.

10. The color management method according to claim 1, further comprising:

identifying discarded vertices of the full GBD that are not included in the simplified spectral GBD;

calculating an error metric for each discarded vertex;

determining for each discarded vertex whether the error metric satisfies an error tolerance;

in response to a determination that the error metric for a vertex does not satisfy the error tolerance, identifying the vertex as a reinstated vertex; and constructing a new simplified spectral GBD using the vertices of the original simplified spectral GBD and the reinstated vertices.

11. The color management method according to claim 10, wherein the error metric is a distance from a discarded vertex to the simplified spectral GBD.

12. The color management method according to claim 11, wherein the distance is a distance measured along a line joining the discarded vertex to a center of the GBD.

13. The color management method according to claim 1, wherein the hulling algorithm is a convex hulling algorithm, and the simplified spectral GBD is a convex hull.

14. The color management method according to claim 1, wherein multi-spectral source devices include multi-spectral digital cameras, and wherein destination devices include multi-ink printers, reflective display devices, and electronic paper.

15. A color management module stored in a memory, wherein the color management module is executed by at least one processor to convert a source-side color in a source device dependent color space into a counterpart destination-side color in a destination device dependent color space, said color management module comprising:

an image access module constructed to perform an accessing step in which a multi-spectral color image generated in the source device dependent color space by using a multi-spectral source device is accessed;

a forward source device conversion module constructed to perform a converting step in which the multi-spectral color image is converted into a spectral reflectance representation in a spectral reflectance space;

an ICS conversion unit constructed to perform a converting step in which the spectral reflectance representation is converted into a spectrally-based Interim Connection Space (ICS) representation in a spectrally-based ICS;

a gamut mapping module constructed to perform a gamut mapping step in which each spectrally-based ICS value of the spectrally-based ICS representation is spectrally gamut mapped onto a spectral gamut of a destination device using a simplified spectral Gamut Boundary Descriptor (GBD) that represents the spectral gamut boundary of the destination device;

an inverse destination device color conversion module constructed to perform a converting step in which each gamut-mapped spectrally-based ICS value is converted into a destination-side color in the destination device dependent color space of the destination device, wherein the simplified spectral GBD is constructed by generating sample points that span the spectral gamut of the destination device, forming a full spectral GBD by applying a hulling algorithm to the sample points, identifying sample points that are vertices of the full GBD of the spectral gamut, partitioning the vertices of the full GBD into clusters, such that the clusters are at least at a certain threshold distance apart, choosing a representative sample point from each cluster, and forming the simplified spectral GBD by applying the hulling algorithm to the representative sample points from each cluster.

16. The color management module according to claim 15, wherein the vertices of the full GBD are partitioned into clusters by performing the steps of:
    forming an initial set of clusters each containing one vertex; and
    selecting a pair of clusters having a smallest distance among all pairs of clusters, and in response to a determination that the distance of the selected pair is less than the threshold distance, merging the selected pair of clusters to form a new cluster,
    wherein the selecting step is repeated until the distances of any remaining pairs of clusters are greater than or equal to the threshold distance.

17. The color management module according to claim 15, wherein for each cluster, a sample point in the cluster farthest away from the center of the full GBD is chosen as the representative sample point of the cluster.

18. The color management module according to claim 15, wherein for each cluster, a sample point in the cluster that represents a most pure color is chosen as the representative sample point of the cluster.

19. The color management module according to claim 15, wherein for each cluster, the full GBD is projected onto a lower dimensional subspace, and a sample point in the cluster that is a vertex in the projection of the full GBD is chosen as the representative sample point of the cluster.

20. The color management module according to claim 15, further comprising:
    an error metric calculation module constructed to perform a calculating step in which an error metric is calculated for the simplified spectral GBD;
    an error tolerance comparison module constructed to perform a determining step in which it is determined whether the error metric satisfies an error tolerance; and
    a threshold adjustment module constructed to perform a step, responsive to a determination that the error metric does not satisfy the error tolerance, in which the threshold distance is decreased, and in which a new simplified spectral GBD is constructed using the decreased threshold distance.

21. The color management module according to claim 20, wherein the error metric is a ratio of a volume of a full spectral GBD to a volume of a new simplified spectral GBD.

22. The color management module according to claim 20, wherein the error metric is a maximum of distances, wherein each distance is a distance of a point in the full spectral GBD to the simplified spectral GBD and the point is outside the simplified spectral GBD.

23. The color management module according to claim 22, wherein the distance is a distance measured along a line joining the point to a center of the GBD.

24. The color management module according to claim 15, further comprising:
    a discarded vertex identification module constructed to perform an identifying step in which discarded vertices of the full GBD that are not included in the simplified spectral GBD are identified;
    an error metric calculation module constructed to perform a calculating step in which an error metric is calculated for each discarded vertex;
    an error tolerance comparison module constructed to perform, for each discarded vertex, a determining step in which it is determined whether the error metric satisfies an error tolerance;
    a reinstatement module constructed to perform an identifying step, responsive to a determination that the error metric for a vertex does not satisfy the error tolerance, in which the vertex is identified as a reinstated vertex; and
    a GBD construction module constructed to perform a constructing step in which a new simplified spectral GBD is constructed using the vertices of the original simplified spectral GBD and the reinstated vertices.

25. The color management module according to claim 24, wherein the error metric is a distance from a discarded vertex to the simplified spectral GBD.

26. The color management module according to claim 25, wherein the distance is a distance measured along a line joining the discarded vertex to a center of the GBD.

27. The color management module according to claim 15, wherein the hulling algorithm is a convex hulling algorithm, and the simplified spectral GBD is a convex hull.

28. The color management module according to claim 15, wherein multi-spectral source devices include multi-spectral digital cameras, and wherein destination devices include multi-ink printers, reflective display devices, and electronic paper.

29. A color management apparatus comprising:
    a computer-readable memory constructed to store computer-executable process steps; and
    a processor constructed to execute the computer-executable process steps stored in the memory;
    wherein the process steps stored in the memory cause the processor to convert a source-side color in a source device dependent color space into a counterpart destination-side color in a destination device dependent color space, and include computer-executable process steps to:
    access a multi-spectral color image in the source device dependent color space generated using a multi-spectral source device;
    convert the multi-spectral color image into a spectral reflectance representation in a spectral reflectance space;
    convert the spectral reflectance representation into a spectrally-based Interim Connection Space (ICS) representation in a spectrally-based ICS;
    spectrally gamut map each spectrally-based ICS value of the spectrally-based ICS representation onto a spectral gamut of a destination device using a simplified spectral Gamut Boundary Descriptor (GBD) that represents the spectral gamut boundary of the destination device; and
    convert each gamut-mapped spectrally-based ICS value into a destination-side color in the destination device dependent color space of the destination device,
    wherein the simplified spectral GBD is constructed by generating sample points that span the spectral gamut of the destination device, forming a full spectral GBD by applying a hulling algorithm to the sample points, identifying sample points that are vertices of the full GBD of the spectral gamut, partitioning the vertices of the full GBD into clusters, such that the clusters are at least at a certain threshold distance apart, choosing a representative sample point from each cluster, and forming the simplified spectral GBD by applying the hulling algorithm to the representative sample points from each cluster.

30. The color management apparatus according to claim 29, wherein the vertices of the full GBD are partitioned into clusters by performing the steps of:
    forming an initial set of clusters each containing one vertex; and
    selecting a pair of clusters having a smallest distance among all pairs of clusters, and in response to a determination that the distance of the selected pair is less than the threshold distance, merging the selected pair of clusters to form a new cluster,
    wherein the selecting step is repeated until the distances of any remaining pairs of clusters are greater than or equal to the threshold distance.

31. The color management apparatus according to claim 29, wherein for each cluster, a sample point in the cluster farthest away from the center of the full GBD is chosen as the representative sample point of the cluster.

32. The color management apparatus according to claim 29, wherein for each cluster, a sample point in the cluster that represents a most pure color is chosen as the representative sample point of the cluster.

33. The color management apparatus according to claim 29, wherein for each cluster, the full GBD is projected onto a lower dimensional subspace, and a sample point in the cluster that is a vertex in the projection of the full GBD is chosen as the representative sample point of the cluster.

34. The color management apparatus according to claim 29, further comprising process steps to:
    calculate an error metric for the simplified spectral GBD;
    determine whether the error metric satisfies an error tolerance; and
    in response to a determination that the error metric does not satisfy the error tolerance, decrease the threshold distance, and construct a new simplified spectral GBD using the decreased threshold distance.

35. The color management apparatus according to claim 34, wherein the error metric is a ratio of a volume of a full spectral GBD to a volume of a new simplified spectral GBD.

36. The color management apparatus according to claim 34, wherein the error metric is a maximum of distances, wherein each distance is a distance of a point in the full spectral GBD to the simplified spectral GBD and the point is outside the simplified spectral GBD.

37. The color management apparatus according to claim 36, wherein the distance is a distance measured along a line joining the point to a center of the GBD.

38. The color management apparatus according to claim 29, further comprising process steps to:
    identify discarded vertices of the full GBD that are not included in the simplified spectral GBD;
    calculate an error metric for each discarded vertex;
    determine for each discarded vertex whether the error metric satisfies an error tolerance;
    in response to a determination that the error metric for a vertex does not satisfy the error tolerance, identify the vertex as a reinstated vertex; and
    construct a new simplified spectral GBD using the vertices of the original simplified spectral GBD and the reinstated vertices.

39. The color management apparatus according to claim 38, wherein the error metric is a distance from a discarded vertex to the simplified spectral GBD.

40. The color management apparatus according to claim 39, wherein the distance is a distance measured along a line joining the discarded vertex to a center of the GBD.

41. The color management apparatus according to claim 29, wherein the hulling algorithm is a convex hulling algorithm, and the simplified spectral GBD is a convex hull.

42. The color management apparatus according to claim 29, wherein multi-spectral source devices include multi-spectral digital cameras, and wherein destination devices include multi-ink printers, reflective display devices, and electronic paper.

43. A non-transitory computer-readable memory medium on which is stored computer-executable process steps for causing a computer to convert a source-side color in a source device dependent color space into a counterpart destination-side color in a destination device dependent color space, said process steps comprising:
    accessing a multi-spectral color image in the source device dependent color space generated using a multi-spectral source device;
    converting the multi-spectral color image into a spectral reflectance representation in a spectral reflectance space;
    converting the spectral reflectance representation into a spectrally-based Interim Connection Space (ICS) representation in a spectrally-based ICS;
    spectrally gamut mapping each spectrally-based ICS value of the spectrally-based ICS representation onto a spectral gamut of a destination device using a simplified spectral Gamut Boundary Descriptor (GBD) that represents the spectral gamut boundary of the destination device; and
    converting each gamut-mapped spectrally-based ICS value into a destination-side color in the destination device dependent color space of the destination device,
    wherein the simplified spectral GBD is constructed by generating sample points that span the spectral gamut of the destination device, forming a full spectral GBD by applying a hulling algorithm to the sample points, identifying sample points that are vertices of the full GBD of the spectral gamut, partitioning the vertices of the full GBD into clusters, such that the clusters are at least at a certain threshold distance apart, choosing a representative sample point from each cluster, and forming the simplified spectral GBD by applying the hulling algorithm to the representative sample points from each cluster.

44. The computer-readable memory medium according to claim 43, wherein the vertices of the full GBD are partitioned into clusters by performing the steps of:
    forming an initial set of clusters each containing one vertex; and
    selecting a pair of clusters having a smallest distance among all pairs of clusters, and in response to a determination that the distance of the selected pair is less than the threshold distance, merging the selected pair of clusters to form a new cluster,
    wherein the selecting step is repeated until the distances of any remaining pairs of clusters are greater than or equal to the threshold distance.

45. The computer-readable memory medium according to claim 43, wherein for each cluster, a sample point in the cluster farthest away from the center of the full GBD is chosen as the representative sample point of the cluster.

46. The computer-readable memory medium according to claim 43, wherein for each cluster, a sample point in the cluster that represents a most pure color is chosen as the representative sample point of the cluster.

47. The computer-readable memory medium according to claim 43, wherein for each cluster, the full GBD is projected onto a lower dimensional subspace, and a sample point in the cluster that is a vertex in the projection of the full GBD is chosen as the representative sample point of the cluster.

48. The computer-readable memory medium to claim 43, wherein the process steps further comprise:
   calculating an error metric for the simplified spectral GBD;
   determining whether the error metric satisfies an error tolerance; and
   in response to a determination that the error metric does not satisfy the error tolerance, decreasing the threshold distance, and constructing a new simplified spectral GBD using the decreased threshold distance.

49. The computer-readable memory medium according to claim 48, wherein the error metric is a ratio of a volume of a full spectral GBD to a volume of a new simplified spectral GBD.

50. The computer-readable memory medium according to claim 48, wherein the error metric is a maximum of distances, wherein each distance is a distance of a point in the full spectral GBD to the simplified spectral GBD and the point is outside the simplified spectral GBD.

51. The computer-readable memory medium according to claim 50, wherein the distance is a distance measured along a line joining the point to a center of the GBD.

52. The computer-readable memory medium according to claim 43, wherein the process steps further comprise:
   identifying discarded vertices of the full GBD that are not included in the simplified spectral GBD;
   calculating an error metric for each discarded vertex;
   determining for each discarded vertex whether the error metric satisfies an error tolerance;
   in response to a determination that the error metric for a vertex does not satisfy the error tolerance, identifying the vertex as a reinstated vertex; and
   constructing a new simplified spectral GBD using the vertices of the original simplified spectral GBD and the reinstated vertices.

53. The computer-readable memory medium according to claim 52, wherein the error metric is a distance from a discarded vertex to the simplified spectral GBD.

54. The computer-readable memory medium according to claim 53, wherein the distance is a distance measured along a line joining the discarded vertex to a center of the GBD.

55. The computer-readable memory medium according to claim 43, wherein the hulling algorithm is a convex hulling algorithm, and the simplified spectral GBD is a convex hull.

56. The computer-readable memory medium according to claim 43, wherein multi-spectral source devices include multi-spectral digital cameras, and wherein destination devices include multi-ink printers, reflective display devices, and electronic paper.

* * * * *